United States Patent
Katsunuma et al.

(10) Patent No.: US 9,921,869 B2
(45) Date of Patent: Mar. 20, 2018

(54) DATA PROCESSING APPARATUS AND DATA PROCESSING METHOD

(71) Applicant: Hitachi, Ltd., Chiyoda-ku, Tokyo (JP)

(72) Inventors: Satoshi Katsunuma, Tokyo (JP); Tsuneyuki Imaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 281 days.

(21) Appl. No.: 14/771,064

(22) PCT Filed: Jul. 19, 2013

(86) PCT No.: PCT/JP2013/069630
§ 371 (c)(1),
(2) Date: Aug. 27, 2015

(87) PCT Pub. No.: WO2015/008379
PCT Pub. Date: Jan. 22, 2015

(65) Prior Publication Data
US 2016/0004555 A1    Jan. 7, 2016

(51) Int. Cl.
G06F 9/46 (2006.01)
G06F 17/30 (2006.01)
(52) U.S. Cl.
CPC .......... *G06F 9/46* (2013.01); *G06F 17/30516* (2013.01)
(58) Field of Classification Search
None
See application file for complete search history.

(56) References Cited

U.S. PATENT DOCUMENTS

| | | | |
|---|---|---|---|
| 8,978,034 B1* | 3/2015 | Goodson | G06F 17/30466 718/101 |
| 2012/0197898 A1* | 8/2012 | Pandey | H04L 67/12 707/741 |
| 2012/0330931 A1 | 12/2012 | Nakano et al. | |

FOREIGN PATENT DOCUMENTS

JP    2011-221799 A    11/2011

OTHER PUBLICATIONS

Girod, Lewis, et al.; XStream: a Signal-Oriented Data Stream Management System; International Conference on Data Engineering (ICDE), Apr. 2008; 10 pages.
PCT International Search Report on application PCT/JP2013/069630 dated Aug. 20, 2013; 2 pages.
PCT Written Opinion on application PCT/JP2013/069630 dated Aug. 20, 2013; 3 pages.

* cited by examiner

*Primary Examiner* — Tammy Lee
(74) *Attorney, Agent, or Firm* — Foley & Lardner LLP

(57) ABSTRACT

A data processing apparatus generates by a stream processing control program, for a time-series first stream data group of stream data out of a time-series stream data sequence, first vector data including elements acquired by collecting respective pieces of stream data of the time-series first stream data group; generates, by the stream processing control program, for a time-series second stream data group including, as a head, a piece of intermediate stream data of the time-series first stream data group and having the same number of pieces of data as the time-series first stream data group, second vector data including elements acquired by collecting respective pieces of stream data of the time-series second stream data group; and inputs, by the stream processing control program, the first and second vector data generated respectively to a batch program to control the batch program to carry out a batch processing.

14 Claims, 35 Drawing Sheets

| STREAM EXECUTION MONITORING VALUE | | |
|---|---|---|
| NUMBER OF PIECES OF DATA TO BE PROCESSED | 240 | 3001 |
| PROCESSING THROUGHPUT | 1/MINUTE | 3002 |
| CALCULATION STATE HOLDING/READING PERIOD | 5 MINUTES | 3003 |

| STREAM PROGRAM INPUT/OUTPUT SETTING | | |
|---|---|---|
| INPUT DATA SIZE | 240 | 3101 |
| OVERLAPPING WIDTH | 3 | 3102 |
| CALCULATION STATE HOLDING NECESSITY | UNNECESSARY | 3103 |

DATA PROCESSING APPARATUS AND DATA PROCESSING METHOD

BACKGROUND OF THE INVENTION

This invention relates to a data processing apparatus and a data processing method for processing data.

In time-series data monitoring processing, for time-series data such as a sensor and a log, rules are defined in a program in advance, and processing such as filtering, summing, abnormality detection, and future estimation for the time-series data is carried out in accordance with the rules. Examples of the time-series data monitoring processing include the monitoring of plants in a factory and the monitoring of servers. The monitoring processing for the factory plant acquires values of sensors for temperature, voltage, and the like mounted to a machine, extracts an abnormal point based on a change in a time series of the value of the sensor over several hours to one day. On the other hand, the monitoring processing for the server acquires usage amounts of a central processing unit (CPU) and a hard disk or a packet amount of a network from a log of the server, and monitors changes in time series thereof over several seconds to several hours, to thereby detect an abnormality. Examples of execution methods of programs for the time-series data monitoring processing include batch processing and stream processing.

A program that carries out the batch processing (hereinafter referred to as "batch program") collects and inputs time series data accumulated in a file or a database as vector data, and collects and outputs a processing result as vector data. As middleware for supporting the execution of the batch program, there is exemplified a batch processing platform disclosed in Japanese Patent Application Laid-open No. 2011-221799. The batch processing platform is middleware of carrying out, for example, scheduling, start, and stop of the batch program. The batch processing is used for a case such as the monitoring for the factory plant, which has low in a requirement for a response time, but high in requirements for a processing throughput and a low cost.

On the other hand, a program of carrying out the stream processing (hereinafter referred to as "stream program") sequentially processes stream data delivered every moment, and also sequentially outputs processing results thereof as stream data. As middleware for supporting the execution of the stream program, there is exemplified a stream processing platform disclosed in a technical document (L. Girod, Y. Mei, S. Rost, A. Thiagarajan, H. Balakrishnan, S. Madden, "XStream: a Signal-Oriented Data Stream Management System", International Conference on Data Engineering (ICDE), April 2008). The stream processing platform is middleware of carrying out, for example, scheduling, start, and stop of the stream program. The stream processing is used for a case such as the monitoring of the server, which has high requirement for the response time but low requirement for the processing throughput and the cost.

As the range of the cases subject to the time-series data monitoring processing expands, development of a program tailored to each case becomes difficult, and existing stream programs and batch programs need to be reused for various cases. However, the requirements such as the response time and the processing throughput differ from case to case such as the monitoring of the factory plant and the server. Thus, in order to reduce the response time, execution of an existing batch program on a stream processing platform is required, and in order to increase the processing throughput, execution of an existing stream program on a batch processing platform is required.

The batch processing platform disclosed in JP 2011-221799 A supports a stream program to operate on a batch platform. For that purpose, the batch processing platform disclosed in JP 2011-221799 A specifies a time range of input data for accumulated data thereon and converts the data in the range into stream data to be executed by the stream program. On the other hand, the stream processing platform disclosed in the technical document, which supports the batch program to operate thereon, executes a batch program which collects a plurality of pieces of stream data into a data block referred to as SigSegs and inputs/outputs the data block for the batch program.

However, when the batch program is executed on the stream processing platform according to the technical document, such a configuration that a plurality of data blocks include the same stream data, that is, an overlap is provided between the pieces of data input to the batch program, is not considered. The stream processing platform according to the technical document fails to execute a batch program which holds a certain number of pieces of time-series data in a window and slides the window for processing.

Moreover, the batch processing platform according to JP 2011-221799 A does not consider an overlap between pieces of stream data. The batch processing platform according to JP 2011-221799 A fails to execute a stream program to slide a window thereon.

In this way, there is a problem in that, for the batch processing and the stream processing, when the processing platform and the program executed on the processing platform are different from each other in the processing content, pieces of the time-series data fail to overlap therebetween.

SUMMARY OF THE INVENTION

This invention has been made in view of the above-mentioned problems, and therefore has an object to execute a program for one of batch processing and stream processing on a processing platform for the other processing in a manner that pieces of time-series data overlap, without changing a code or an algorithm of the program for the one processing executed on the processing platform for the other processing.

First aspect of the invention disclosed in this application is a data processing apparatus, comprising: a processor; and a memory for storing a stream program for carrying out stream processing, a batch program for carrying out batch processing, and a stream processing control program for controlling the stream program, the processor being configured to carry out: a first generation procedure of generating, by the stream processing control program, for a time-series first stream data group of stream data out of a time-series stream data sequence, first vector data including elements acquired by collecting respective pieces of stream data of the time-series first stream data group; a second generation procedure of generating, by the stream processing control program, for a time-series second stream data group including, as a head, a piece of intermediate stream data of the time-series first stream data group in the time-series stream data sequence and having the same number of pieces of data as the time-series first stream data group, second vector data including elements acquired by collecting respective pieces of stream data of the time-series second stream data group; and a control procedure of inputting, by the stream processing control program, the first vector data and the second vector data generated respectively by the first generation procedure and the second generation procedure to the batch program to control the batch program to carry out the batch processing.

Second aspect of the invention disclosed in this application is a data processing apparatus, comprising: a processor; and a memory for storing a batch program for carrying out batch processing, a stream program for carrying out stream processing, and a batch processing control program for controlling the batch program, the processor being configured to carry out: a first generation procedure of generating, by the batch processing control program, from vector data including an element sequence of values at respective times, a first stream data group, which is a time series acquired by dividing respective elements of a first element group in the element sequence; a second generation procedure of generating, by the batch processing control program, for a time-series second element group including, as a head, an intermediate element of the first element group in the element sequence and having the same number of elements as the first element group, a second stream data group, which is a time series acquired by dividing the respective elements of the second element group; a control procedure of inputting, by the batch processing control program, the first stream data group and the second stream data group generated respectively by the first generation procedure and the second generation procedure to the stream program to control the stream program to carry out the stream processing; and a conversion procedure of acquiring, by the batch processing control program, pieces of stream data of a third stream data group, which is an execution result of the input of the first stream data group to the stream program and the execution of the stream processing by the control procedure, acquiring a fourth stream data group, which is an execution result of the input of the second stream data group to the stream program and the execution of the stream processing by the control procedure, and converting a stream data group acquired by removing stream data of the fourth stream data group overlapping the stream data of the third stream data group from the fourth stream data group into second vector data.

According to representative embodiments of this invention, a program for one of the batch processing and the stream processing may be executed on a processing platform for the other processing in a manner that pieces of time-series data overlap, without changing a code or an algorithm of the program for the one processing executed on the processing platform for the other processing. Other objects, configurations, and effects than those described above are clarified by the following description of an embodiment.

BRIEF DESCRIPTION OF THE DRAWINGS

FIG. 30 is an explanatory diagram for illustrating an example of the stream execution monitoring value.

FIG. 31 is an explanatory diagram for illustrating an example of the stream program input/output setting illustrated in FIG. 27 and FIG. 29.

DETAILED DESCRIPTION OF THE PREFERRED EMBODIMENTS

According to this invention, a program for one of batch processing and stream processing is executed on a processing platform for the other in a manner that pieces of time-series data overlap therebetween, to thereby execute the other processing. As a result, without changing a code or an algorithm of the program for one of the batch processing and the stream processing executed on the processing platform for the other, the program for the one processing can be executed on the processing platform for the other processing.

Thus, an existing program can be used on a processing platform different in the type of processing, and can be executed easily and efficiently. A description is now independently given of an example (first embodiment) in which a batch program is executed on a stream processing platform, and an example (second embodiment) in which a stream program is executed on a batch processing platform.

It should be noted that "program" or "processing platform" is sometimes used as a subject in the description herein, but "program" or "processing platform" is executed by a processor to carry out defined processing by using a memory and a communication port (communication control device), and hence the description may be provided with the "processor" used as the subject. Moreover, processing disclosed with the "program" used as the subject may be considered as processing carried out by a computer. Moreover, part or entirety of the program may be implemented by dedicated hardware.

(First Embodiment)

Figure 1:
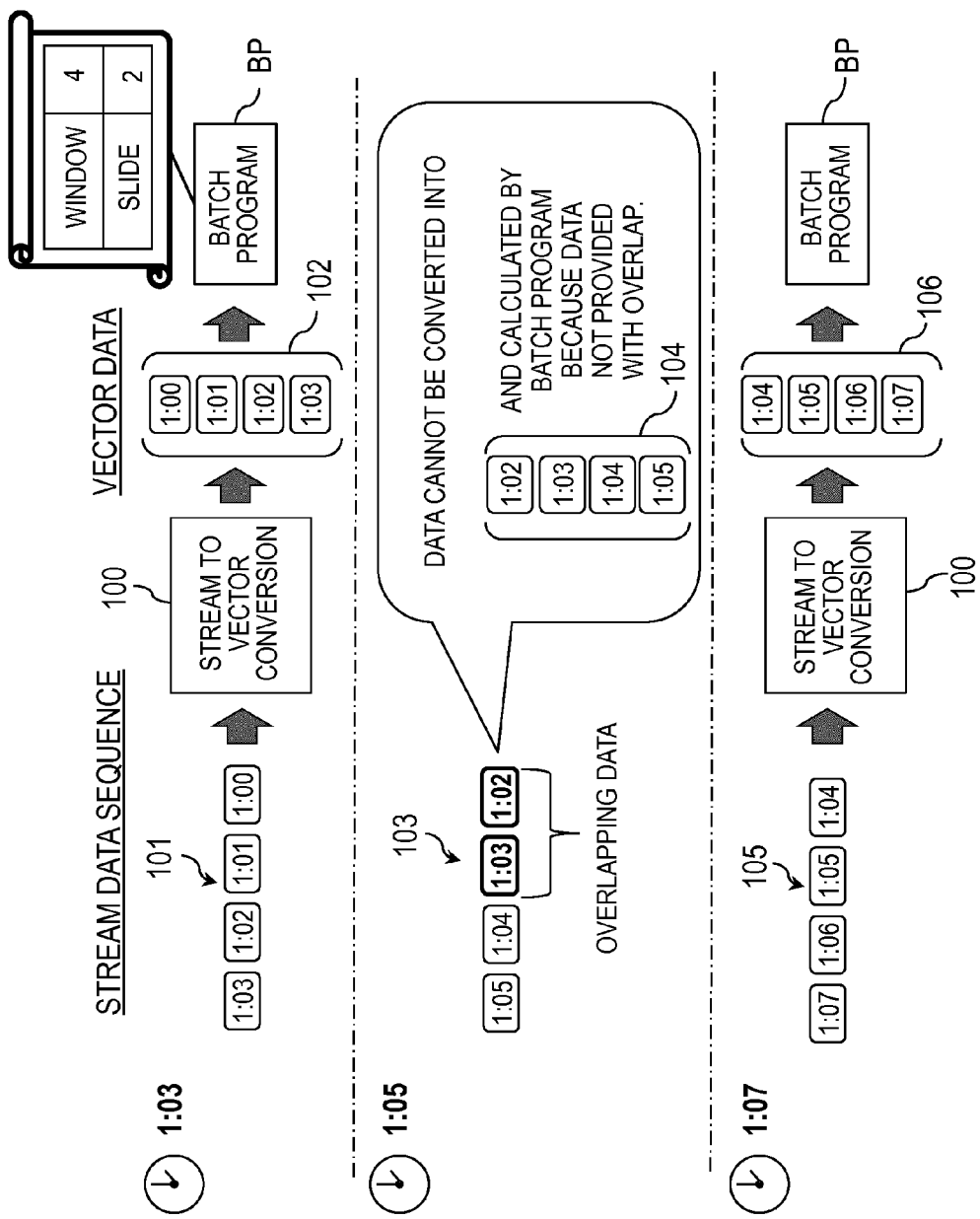
FIG. 1 is an explanatory diagram for illustrating an example in which a batch program is executed on a stream processing platform.
Figure 2:
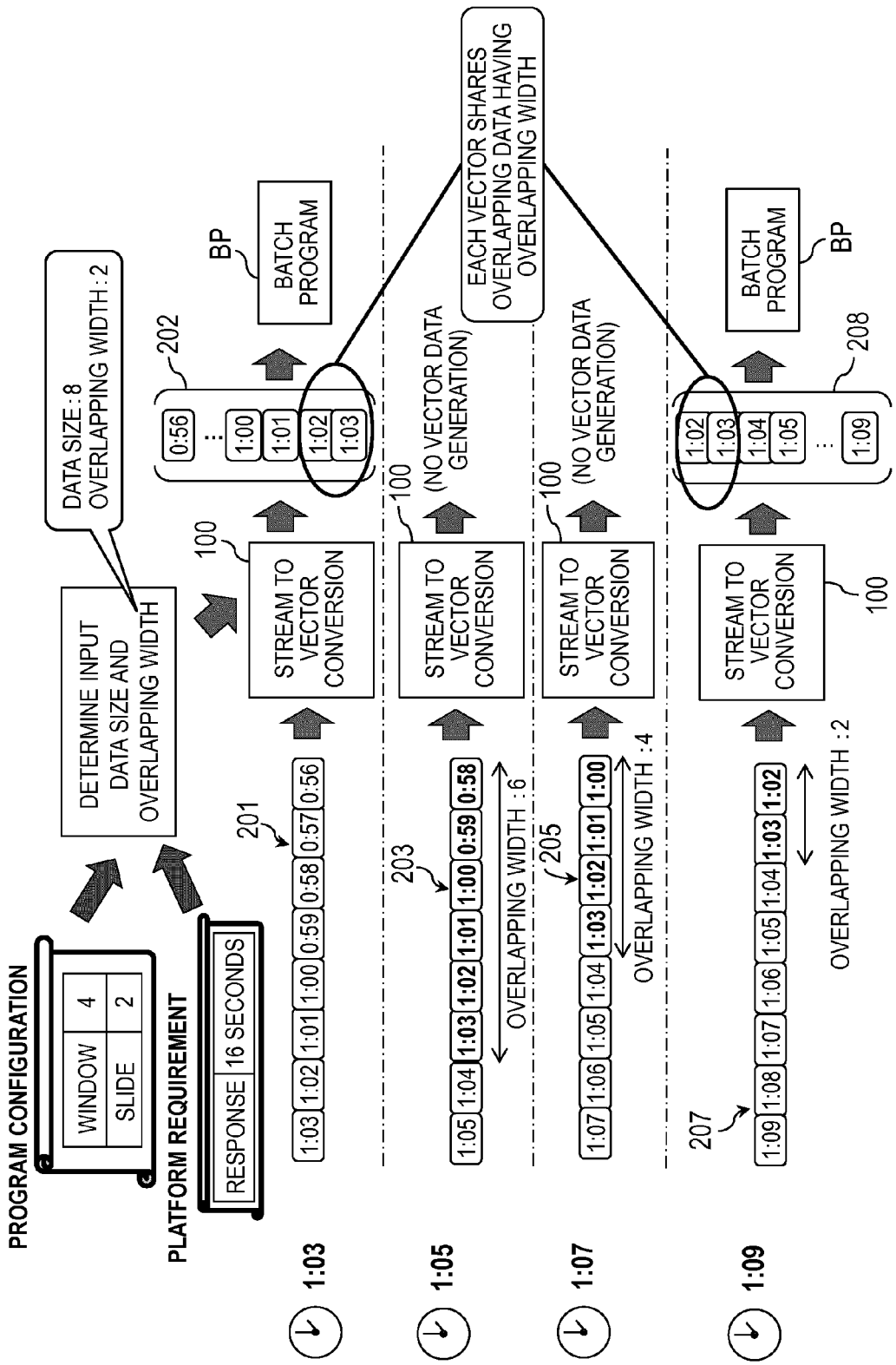
FIG. 2 is an explanatory diagram for illustrating an example in which a batch program is executed on a stream processing platform.

FIG. 1 and FIG. 2 are explanatory diagrams for illustrating examples in which a batch program is executed on a stream processing platform. FIG. 1 is a diagram for illustrating an execution example of a case in which an overlap is not provided between pieces of data. The batch program is configured to have a window width corresponding to four pieces of data and a slide data count corresponding to two pieces of data, which is the number of pieces of data to be slid. It should be noted that the unit of time is, for example, "second". The stream processing platform carries out predetermined calculation while sliding the window width corresponding to the four pieces of stream data by the amount of the two pieces of stream data at a time.

At a time 1:03, the stream processing platform uses a stream to vector conversion 100 to convert a stream data sequence 101 from a time 1:00 to the time 1:03 into vector data 102, which is a data block. As a result, the stream processing platform provides the vector data 102 to a batch program BP, and the batch program BP uses the vector data 102 to carry out calculation. It should be noted that the slide data count is 2, and a next subject stream data sequence is thus a stream data sequence 103 at a time 1:05.

The stream data sequence 103 at the time 1:05 includes stream data at a time 1:02 and a time 1:03, and thus overlaps the stream data sequence 101. The stream processing platform does not provide an overlap between pieces of data, and hence cannot use the stream to vector conversion 100 to convert the stream data sequence 103 into vector data 104. Thus, the stream processing platform cannot provide the vector data 104 to the batch program BP, and the batch program BP cannot use the vector data 104 to carry out calculation. It should be noted that the slide data count is 2, and a next subject stream data sequence is thus a stream data sequence 105 at a time 1:07.

The stream data sequence 105 at the time 1:07 does not overlap the stream data in the stream data sequence 101. The stream processing platform does not provide an overlap between pieces of vector data after the conversion, and hence, when the stream data sequence 105 is provided, the stream processing platform uses the stream to vector conversion 100 to convert the provided stream data sequence 105 into vector data 106. As a result, the stream processing platform provides the vector data 106 to the batch program BP, and the batch program BP uses the vector data 106 to carry out calculation.

FIG. 2 is an illustration of an execution example of a case in which an overlap is provided between pieces of data. The program configuration of the batch program is the same as that of FIG. 1. Moreover, in FIG. 2, a response, which is a platform requirement, is 16 seconds. The response is a period from an input of stream data to a completion of the processing.

The stream processing platform determines an input data size and an overlapping width based on the program configuration and the platform requirement. The input data size is the number of pieces of stream data included in converted vector data. On this occasion, the input data size is 8. Moreover, the overlapping width is 2, which is the same as FIG. 1.

First, at a time 1:03, the stream processing platform uses the stream to vector conversion 100 to convert a stream data sequence 201 from a time 0:56 to the time 1:03 into vector data 202, which is a data block. As a result, the stream processing platform provides the vector data 202 to a batch program BP, and the batch program BP uses the vector data 202 to carry out calculation. It should be noted that the slide data count is 2, and a next subject stream data sequence is thus a stream data sequence 203 at a time 1:05.

The stream data sequence 203 at the time 1:05 includes stream data at a time 0:58 to the time 1:03, and thus the overlapping width with the stream data sequence 201 is 6. This exceeds the set overlapping width of 2, and hence at the time 1:05, the stream processing platform does not use the stream to vector conversion 100 to convert the stream data sequence 203 into vector data. It should be noted that the slide data count is 2, and a next subject stream data sequence is thus a stream data sequence 205 at a time 1:07.

Also at the time 1:07, as at the time 1:05, the stream data sequence 205 at the time 1:07 includes stream data at a time 1:00 to the time 1:03, and thus the overlapping width with the stream data sequence 201 is 4. This exceeds the set overlapping width of 2, and hence also at the time 1:07, the stream processing platform does not use the stream to vector conversion 100 to convert the stream data sequence 205 into vector data. It should be noted that the slide data count is 2, and a next subject stream data sequence is a stream data sequence 207 at a time 1:09.

The stream data sequence 207 at the time 1:09 includes stream data at a time 1:02 and the time 1:03, and thus the overlapping width with the stream data sequence 201 is 2. This matches the set overlapping width of 2, and hence at the time 1:09, the stream processing platform uses the stream to vector conversion 100 to convert the stream data sequence 207 into vector data 208. As a result, the stream processing platform provides the vector data 208 to the batch program BP, and the batch program BP uses the vector data 208 to carry out calculation.

In this way, in the example of FIG. 2, overlapping between the pieces of vector data 202 and 208 avoids the state in which the calculation cannot be carried out as for the vector data 104 of FIG. 1 and maintains semantics of the batch program. Moreover, the data size of the vector data is determined so that only pieces of data corresponding to the set overlapping width overlap. In the example of FIG. 2, vector data is not generated at the time 1:05 and the time 1:07. This is because even if vector data is not generated at those times, the pieces of vector data 202 and 208 can cover the data to be calculated. This suppresses the generation of vector data exceeding the overlapping width and reduces a processing load.

<System Configuration Example>

Figure 3:
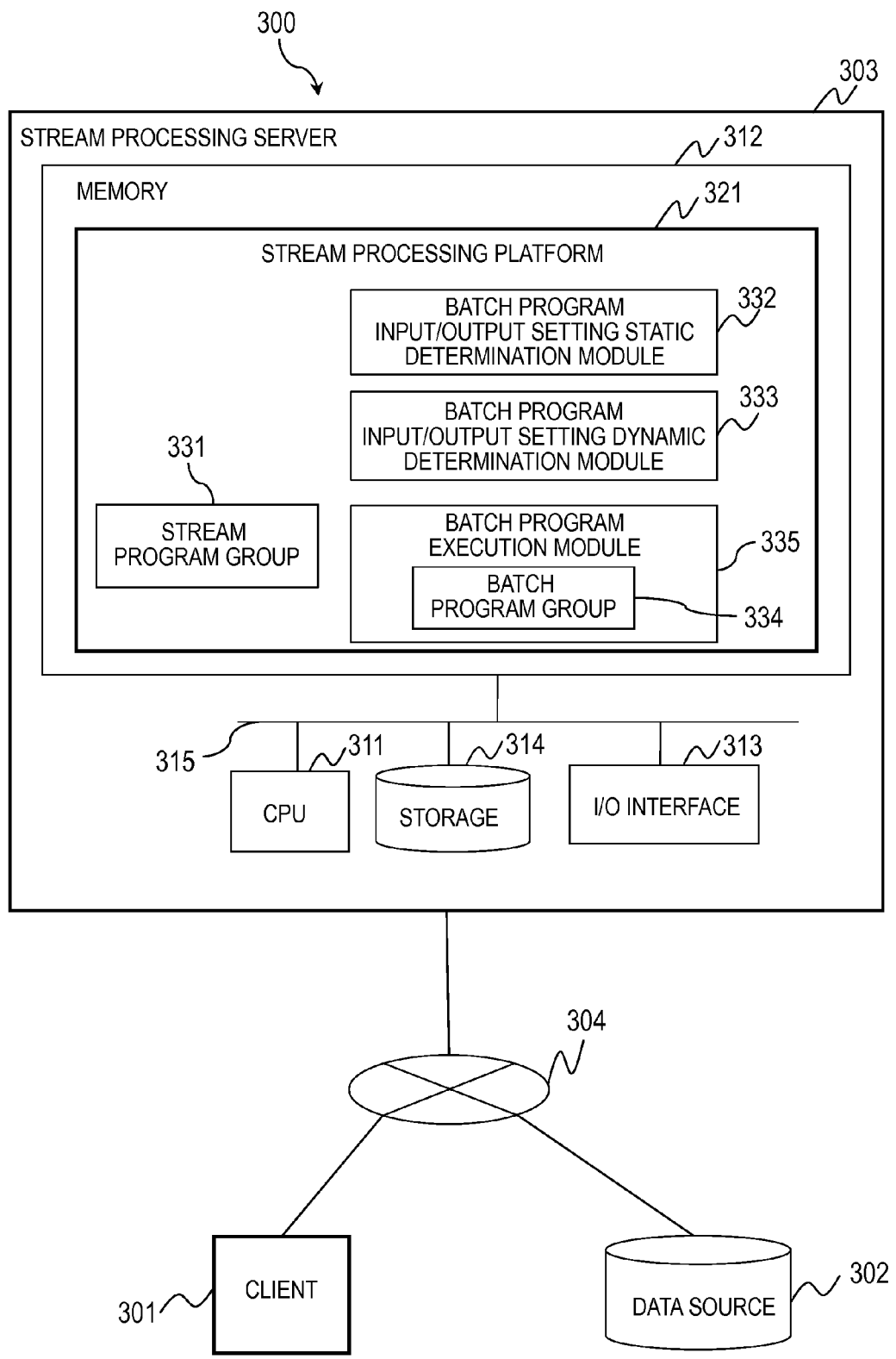
FIG. 3 is a system configuration diagram for illustrating an example of a stream processing system.

FIG. 3 is a system configuration diagram for illustrating an example of a stream processing system 300. The stream processing system 300 has such a configuration that a client 301, a data source 302, and a stream processing server 303 are communicably coupled to one another over a network. The network 304 may be, for example, the Ethernet (trademark), a local area network (LAN) coupled via an optical fiber, or a wide area network (WAN) including the Internet lower in the speed than the LAN. Moreover, the client 301, the data source 302, and the stream processing server 303 may be arbitrary computers such as personal computers (PCs) and blade computer systems.

The client 301 is a computer for carrying out registration processing for the stream processing server 303. The registration processing is described in detail later.

The data source 302 is a supply source for supplying a series of time-series data to be processed to the stream processing server 303, and examples of the data source 302 include the above-mentioned factory plant and server. In the case of the factory plant, for example, values of sensors for temperature and voltage mounted to a machine constitute the time-series data. Moreover, in the case of the server, usage amounts of a CPU and a hard disk acquired from a log of the server, and a packet amount of the network 304 constitute the time-series data.

The stream processing server 303 is a computer in which a CPU 311, a memory 312, an I/O interface 313, and a storage 314 are coupled to one another via a bus 315. The stream processing server 303 makes access to the network 304 via the I/O interface 313. Moreover, the stream processing server 303 can store a processing result, an intermediate result of processing, and setting data required for a system operation in the nonvolatile storage 314. The storage 314 is directly coupled via the I/O interface 313, but may be coupled via the I/O interface 313 and the network 304 outside the stream processing server 303.

A stream processing platform 321 is mapped to the memory 312. The stream processing platform 321 is middleware to which modules for general stream processing are mapped. The modules for general stream processing are at least one stream program such as a start/stop module and a scheduling module in a stream program group 331. Moreover, the following modules are mapped to the stream processing platform 321. Specifically, the modules include a batch program input/output setting static determination module 332, a batch program input/output setting dynamic determination module 333, and a batch program execution module 335 including a batch program group 334, which is at least one batch program.

<Stream Program>

Figure 4:
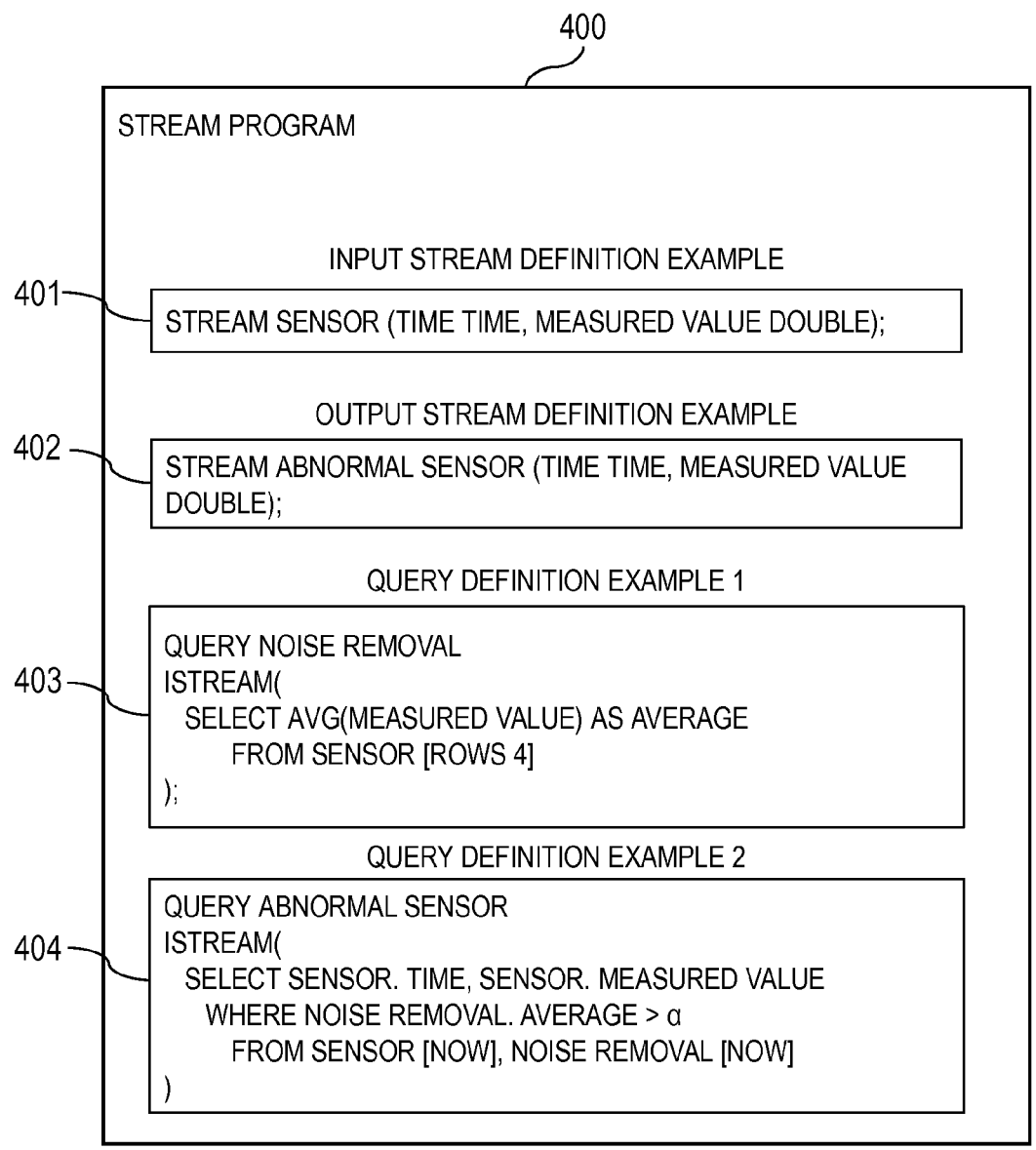
FIG. 4 is an explanatory diagram for illustrating an example of the stream program included in the stream program group 331 illustrated in FIG. 3.

FIG. 4 is an explanatory diagram for illustrating an example of the stream program included in the stream program group 331 illustrated in FIG. 3. A stream program 400 is a program of inputting/outputting stream data. In FIG. 4, a stream program 400 defined in the continuous query language (CQL) is illustrated. The stream program 400 includes an input stream definition, an output stream definition, and a query definition group.

As the input stream definition, a sensor stream 401 including "time" and "measured value" as columns is defined. Moreover, as the output stream definition, an abnormal sensor stream 402 including "time" and "measured value" as columns is defined.

The query definition group includes a query definition 1 and a query definition 2. As the query definition 1, a noise removal query 403 is defined, and as the query definition 2, an abnormal sensor query 404 is defined. The noise removal query 403 is a query for inputting the stream data from the sensor stream 401, and calculating an average of four recent measured values.

The abnormal sensor query 404 is a query for outputting, when the average calculated by the noise removal query 403 is more than $\alpha$, the stream data of the sensor stream 401 to the abnormal sensor stream 402. It should be noted that FIG. 4 is an explanatory diagram for illustrating an example of the stream program 400, and the stream program 400 may be defined in, instead of the CQL, the C language, the Java language, or another arbitrary programming language.

Figure 5:
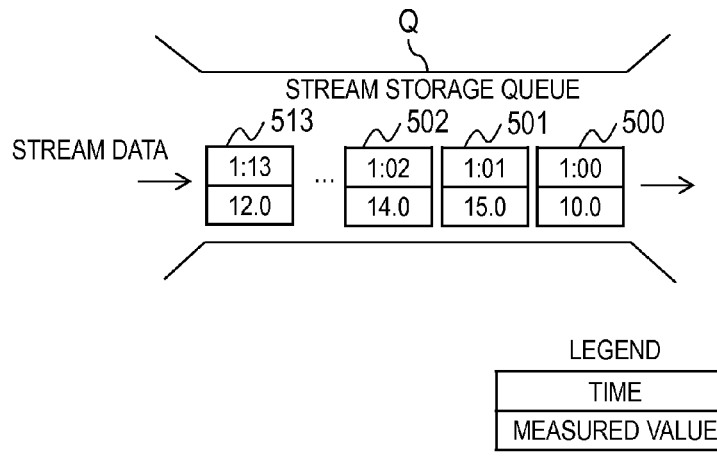
FIG. 5 is an explanatory diagram for illustrating an example of the stream data.

FIG. 5 is an explanatory diagram for illustrating an example of the stream data. Pieces of stream data 500 to 513 include times, and are stored in a stream storage queue Q in a time sequence. In FIG. 5, as shown in the legend, the pieces of stream data 500 to 513 each including a time and a measured value as columns are illustrated. In the stream storage queue Q, the stream data 500 including a time "1:00" and a measured value "10.0" is stored at the head, and subsequently the stream data 501 including a time "1:01" and a measured value "15.0" and the stream data 502 including a time "1:02" and a measured value "14.0" are stored. Then, the stream data 513 including a time "1:13" and a measured value "12.0" is stored at the end of the stream storage queue Q.

<Batch Program>

Figure 6:
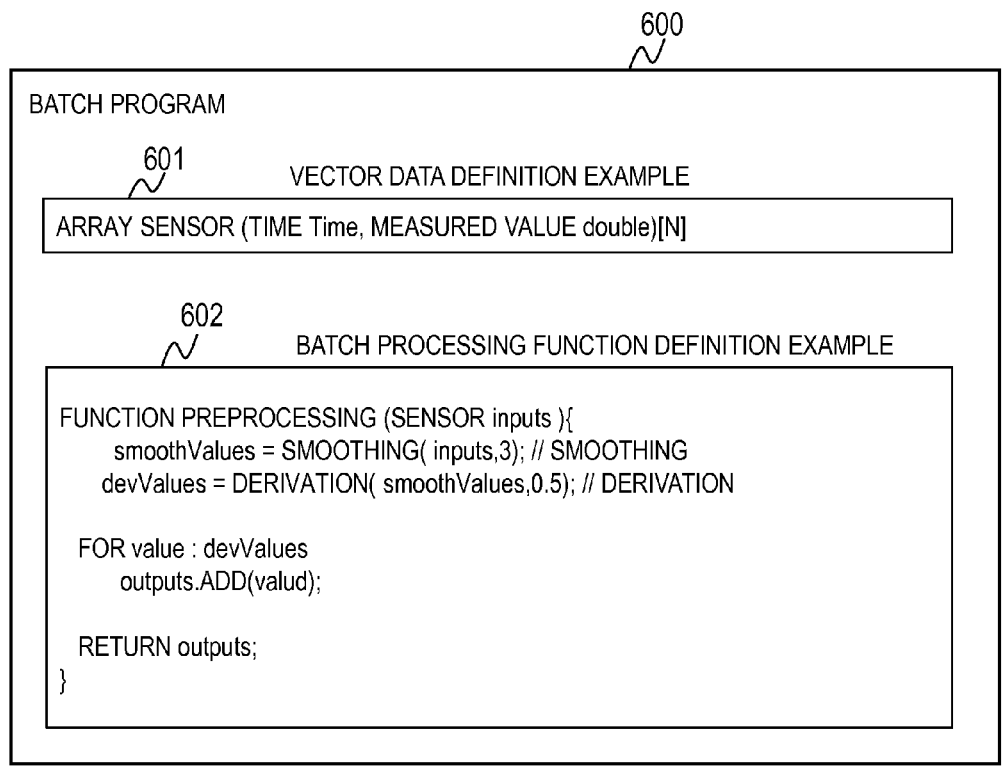
FIG. 6 is an explanatory diagram for illustrating an example of the batch program included in the batch program group illustrated in FIG. 3.

FIG. 6 is an explanatory diagram for illustrating an example of the batch program included in the batch program group 334 illustrated in FIG. 3. A batch program 600 is a program of inputting/outputting vector data. In FIG. 6, the batch program 600 includes a definition of vector data and a batch processing function.

As the vector data definition, a sensor array 601 including "time" and "measured value" as columns is defined. Moreover, as the batch processing function definition, a preprocessing function 602 is defined. The preprocessing function 602 inputs the sensor array 601, and uses a function SMOOTHING to acquire a weighted average of three recent measured values, to thereby smooth the measured values.

Then, the preprocessing function 602 uses a function DERIVATION to calculate a derivative from a current value and a previous value of the smoothed value. It should be noted that the function DERIVATION samples the elements of the vector data to reduce the number of elements by 50%. For example, when eight elements at times 1:01, 1:02, 1:03, 1:04, 1:05, 1:06, 1:07, and 1:08 are input to the function DERIVATION, the function DERIVATION reduces the eight elements by 50%. As a result, the four elements at the times 1:01, 1:03, 1:05, and 1:07 are output. The preprocessing function 602 outputs the derivative calculated by the function DERIVATION to the sensor array 601, and finishes the processing.

It should be noted that FIG. 6 is an explanatory diagram for illustrating an example of the batch program 600, and the batch program 600 may be defined in the R language, the C language, the Java language, or another arbitrary programming language.

Figure 7:
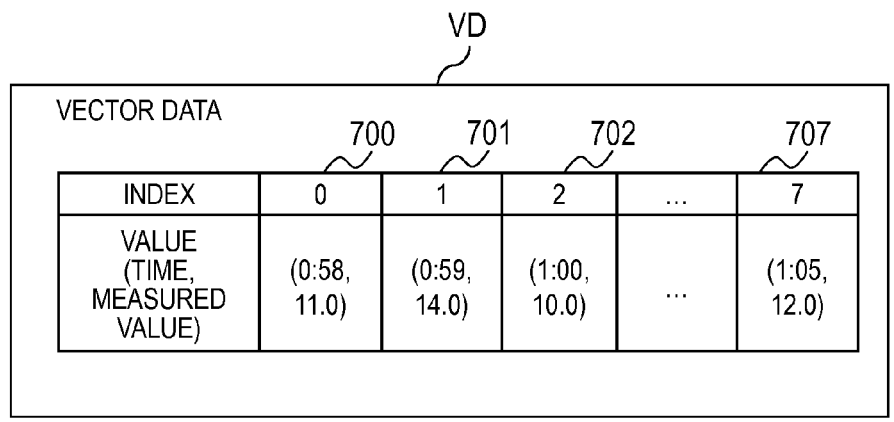
FIG. 7 is an explanatory diagram for illustrating an example of the vector data.

FIG. 7 is an explanatory diagram for illustrating an example of the vector data. The vector data VD is a set including a plurality of elements. The vector data VD illustrated in FIG. 7 is realized as an array, and each of elements of the array includes the value of the time and the measured value. As the elements of the array, the vector data VD includes, at an index 0, an element 700 including a time "0:58" and a measured value "11.0", at an index 1, an element 701 including a time "0:59" and a measured value "14.0", at an index 2, an element 702 including a time "1:00" and a measured value "10.0", and, finally, at an index 7, an element 707 including a time "1:05" and a measured value "12.0". It should be noted that a method of realizing the vector data VD may be a data structure such as the list instead of the array.

<Batch Program Input/Output Setting Static Determination Module 332>

Figure 8:
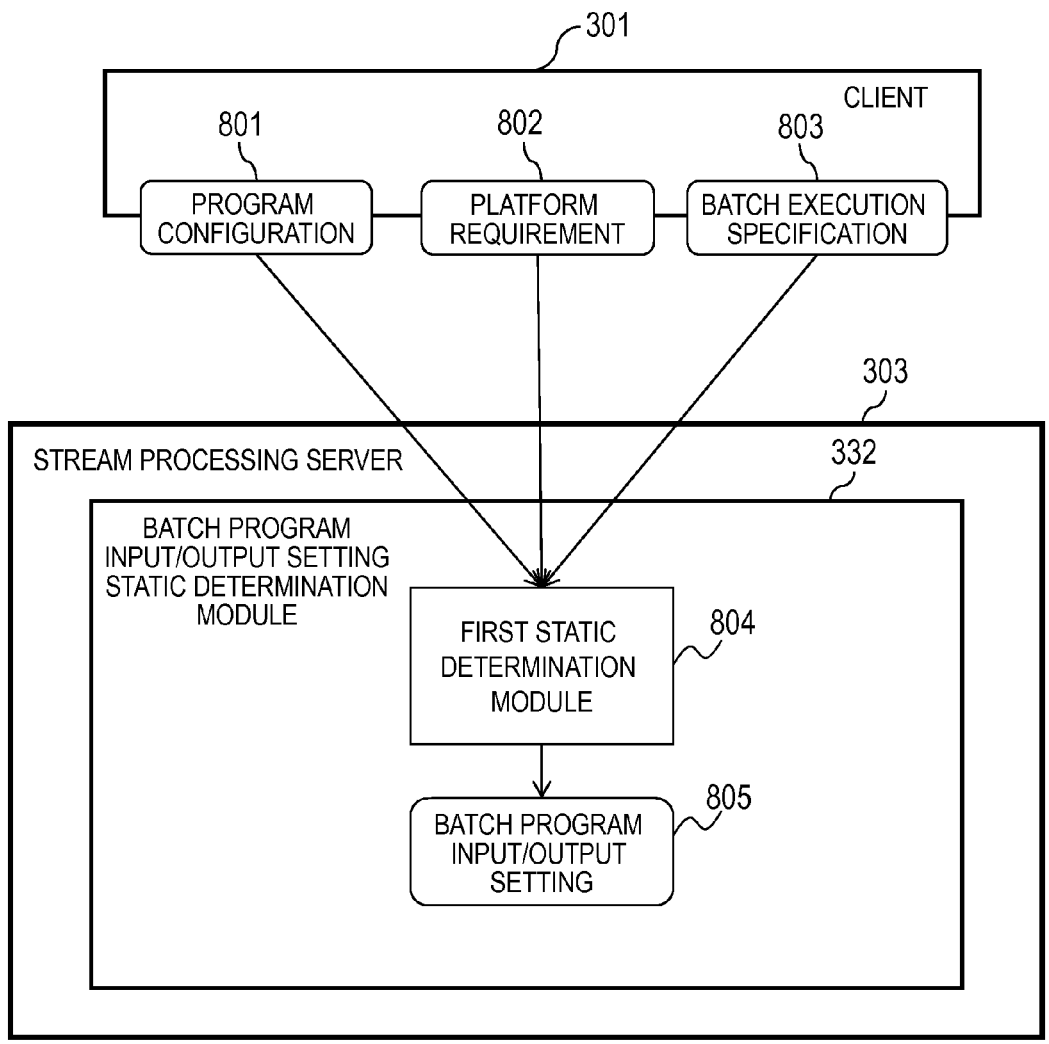
FIG. 8 is an explanatory diagram for illustrating an input/output relationship of the batch program input/output setting static determination module 332 illustrated in FIG. 3.

FIG. 8 is an explanatory diagram for illustrating an input/output relationship of the batch program input/output setting static determination module 332 illustrated in FIG. 3. The batch program input/output setting static determination module 332 is a program executed by the CPU 311 on the stream processing platform 321, and determines a static input/output setting of the batch program 600. The batch program input/output setting static determination module 332 includes a first static determination module 804.

The first static determination module 804 receives registration information such as a program configuration 801, a platform requirement 802, and a batch execution specification 803 from the client 301. Then, the first static determination module 804 determines a static input data size and overlapping width of the batch program 600. The determined input data size and overlapping width are output as a batch program input/output setting. The input data size and the overlapping width are described later.

<Program Configuration 801>

Figure 9:
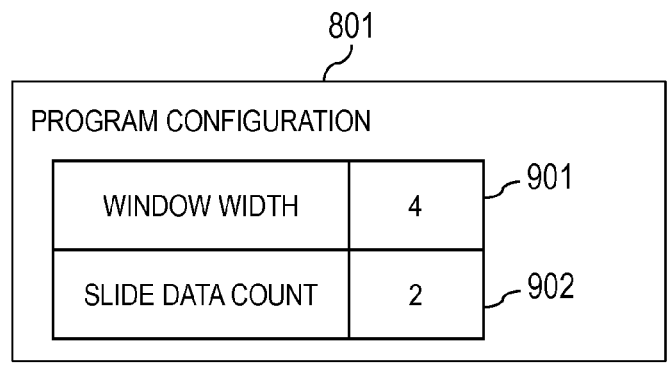
FIG. 9 is an explanatory diagram for illustrating an example of the program configuration 801 illustrated in FIG. 8.

FIG. 9 is an explanatory diagram for illustrating an example of the program configuration 801 illustrated in FIG. 8. The program configuration 801 is information in which parameters configuring an operation of a program are set. Examples of the parameters include a window width 901 and a slide data count 902, and the parameters are specified by a user operating the client 301.

The window width 901 represents a width of a window including time-series data required by the processing by the stream program 400 and the batch program 600. In other words, the width of the window is the number of pieces of time-series data included in the window. The slide data count 902 is a size of sliding the window for each processing. For example, for the stream program 400 illustrated in FIG. 4, the noise removal query 403 continues the calculation of the average of the four recent measured values by shifting one piece of data at a time, and hence the window width 901 is 4, and the slide data count 902 is 1.

Moreover, the batch program 600 illustrated in FIG. 5 uses the function SMOOTHING to acquire the weighted average of three recent measured values and uses the function DERIVATION to calculate the derivative from the current value and the previous value. Thus, in the preprocessing function 602 including the functions SMOOTHING and DERIVATION, the total window width 901 is 4. Moreover, in the function DERIVATION, the elements of the vector data VD are sampled for the reduction of the number of the elements by 50%, and the slide data count 902 is thus 2.

<Platform Requirement 802>

Figure 10:
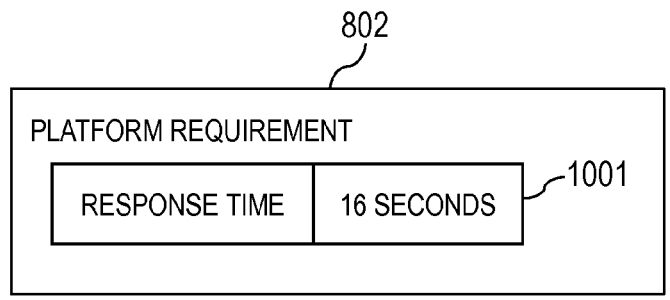
FIG. 10 is an explanatory diagram for illustrating an example of the platform requirement 802 illustrated in FIG. 8.

FIG. 10 is an explanatory diagram for illustrating an example of the platform requirement 802 illustrated in FIG. 8. The platform requirement 802 is a condition imposed on the stream processing platform 321. An example of the parameter includes a response time 1001, and the parameter is specified by the user operating the client 301. The response time 1001 is a period which extends from an input of the data to the stream processing server 303 until the processing completion of the data, and which the user can permit. In FIG. 10, the response time 1001 is specified as "16 seconds", and a period up to 16 seconds is permitted for the period from the input of data until the processing completion of the data.

<Batch Execution Specification 803>

Figure 11:
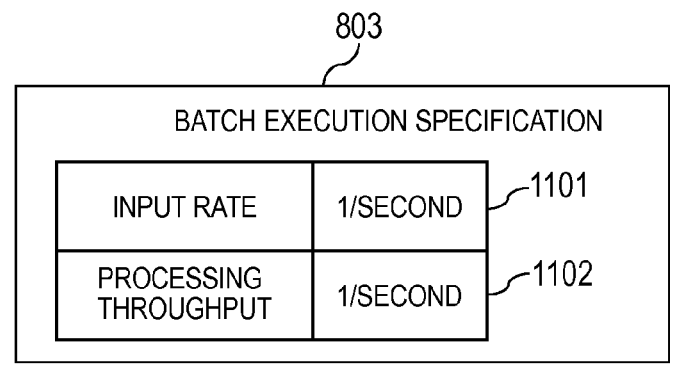
FIG. 11 is an explanatory diagram for illustrating an example of the batch execution specification illustrated in FIG. 8.

FIG. 11 is an explanatory diagram for illustrating an example of the batch execution specification 803 illustrated in FIG. 8. The batch execution specification 803 is information defining an execution method of the batch processing. Examples of the parameters include an input rate 1101 and a processing throughput 1102, and the parameters are specified by the user operating the client 301. The input rate 1101 represents an interval of an arrival of the stream data input to the batch program 600. In FIG. 11, the input rate 1101 is 1/second, which represents that one piece of stream data arrives per second. Moreover, the processing throughput 1102 is the number of elements of the vector data VD processed by the batch program 600 per unit time. In FIG. 11, the processing throughput 1102 is 1/second, which represents that the batch program 600 can process one element per second.

<Batch Program Input/Output Setting Dynamic Determination Module>

Figure 12:
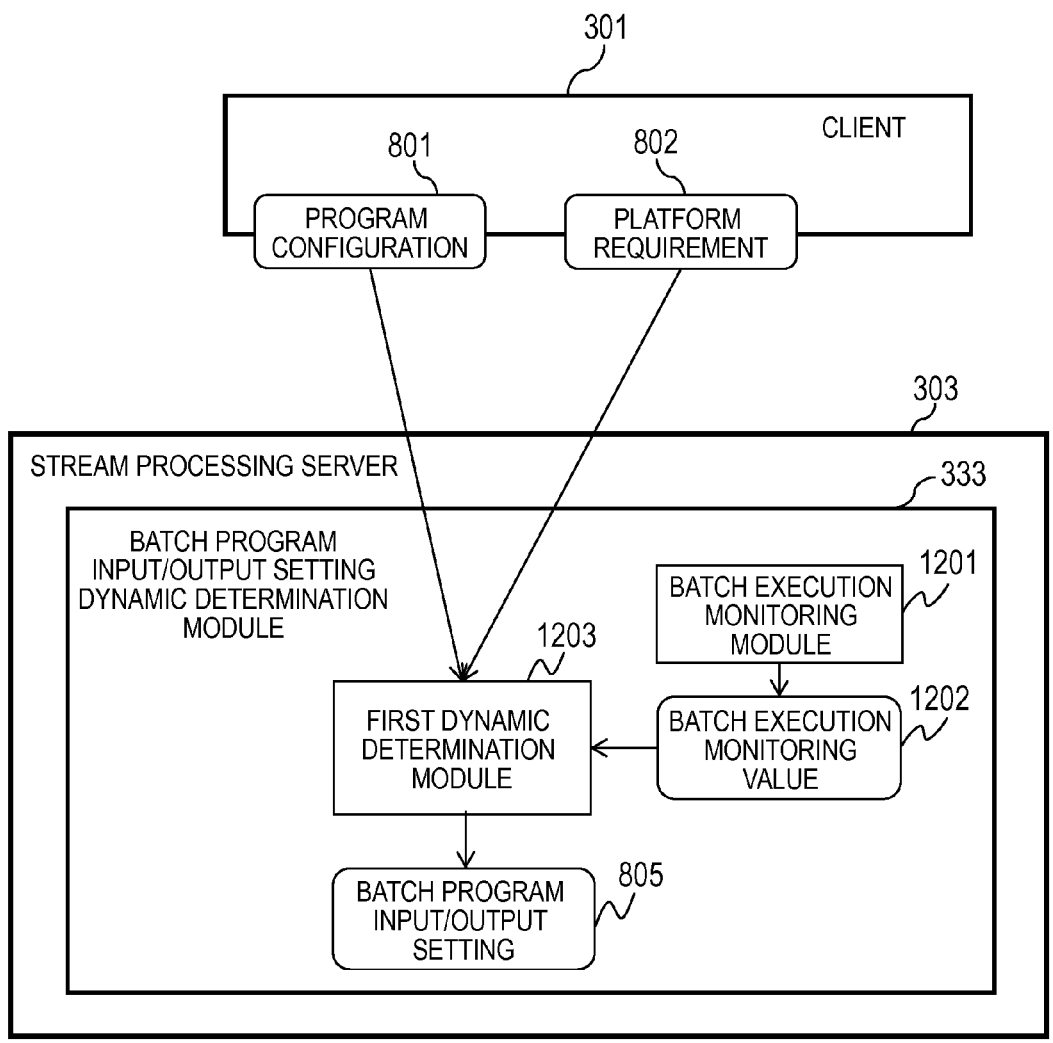
FIG. 12 is an explanatory diagram for illustrating an input/output relationship of the batch program input/output setting dynamic determination module illustrated in FIG. 3.

FIG. 12 is an explanatory diagram for illustrating an input/output relationship of the batch program input/output setting dynamic determination module 333 illustrated in FIG. 3. The batch program input/output setting dynamic determination module 333 is a program executed by the CPU 311 on the stream processing platform 321, and determines a dynamic input/output setting of the batch program 600. The batch program input/output setting dynamic determination module 333 includes a batch execution monitoring module 1201 and a first dynamic determination module 1203.

The batch execution monitoring module 1201 monitors the running batch program 600, and generates a batch execution monitoring value 1202. The batch execution monitoring value 1202 is an observed value in the running batch program 600. The batch execution monitoring value 1202 is described later.

The first dynamic determination module 1203 receives the program configuration 801 illustrated in FIG. 9 and the platform requirement 802 illustrated in FIG. 10 from the client 301, and the batch execution monitoring value 1202. Then, the first dynamic determination module 1203 determines a dynamic input data size and overlapping width of the batch program 600. The determined input data size and overlapping width are output as a batch program input/output setting 805. The input data size and the overlapping width are described later.

<Batch Execution Monitoring Value 1202>

Figure 13:
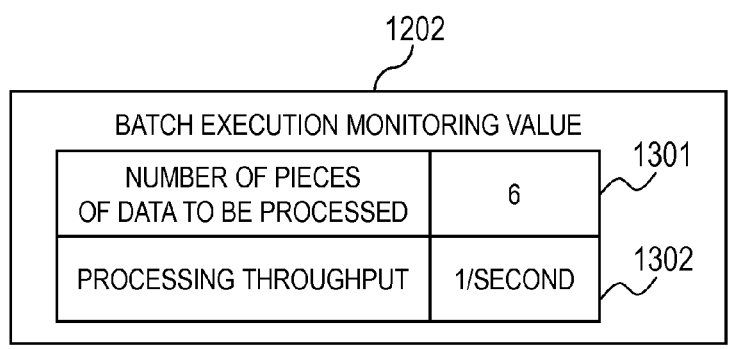
FIG. 13 is an explanatory diagram for illustrating an example of the batch execution monitoring value.

FIG. 13 is an explanatory diagram for illustrating an example of the batch execution monitoring value 1202. The batch execution monitoring value 1202 includes, as parameters, the number of pieces of data to be processed 1301 and a processing throughput 1302, and is output by the batch execution monitoring module 1201. The number of pieces of data to be processed 1301 is the number of pieces of stream data input to the batch program 600 and stored in the stream storage queue Q. In FIG. 13, the number of pieces of data to be processed 1301 is "6", which represents that six pieces of the stream data exist in the stream storage queue Q. Moreover, the processing throughput 1302 is a size of values of the vector data VD processed by the batch program 600 per unit time.

<Batch Program Input/Output Setting 805>

Figure 14:
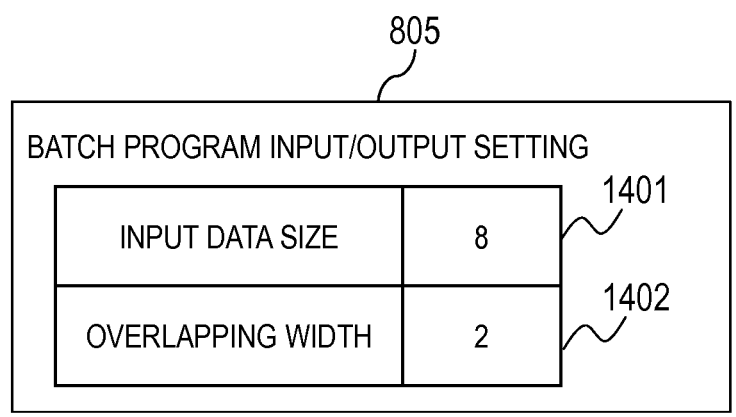
FIG. 14 is an explanatory diagram for illustrating an example of the batch program input/output setting 805 illustrated in FIG. 8 and FIG. 12.

FIG. 14 is an explanatory diagram for illustrating an example of the batch program input/output setting 805 illustrated in FIG. 8 and FIG. 12. The batch program input/output setting 805 is information defining data to be input and output to and from the batch program 600. Examples of the parameters include an input data size 1401 and an overlapping width 1402, and the parameters are specified by the user operating the client 301. The input data size 1401 is the number of elements of the vector data VD input to the batch program 600.

For example, in the case of the vector data VD illustrated in FIG. 7, the elements 700 to 707 indicated by the indices 0 to 7 exist, and the number of the elements of the vector data VD is 8. Moreover, the overlapping width 1402 is the number of overlapping elements between the current vector data VD and the previous vector data VD input to the batch program 600. For example, when the vector data VD illustrated in FIG. 7 is input to the batch program 600, and the element 701 indicated by the index 0 and the element 702 indicated by the index 1 are included in the previous vector data VD input to the batch program 600, the overlapping width 1402 is 2.

<Batch Program Execution Module 335>

Figure 15:
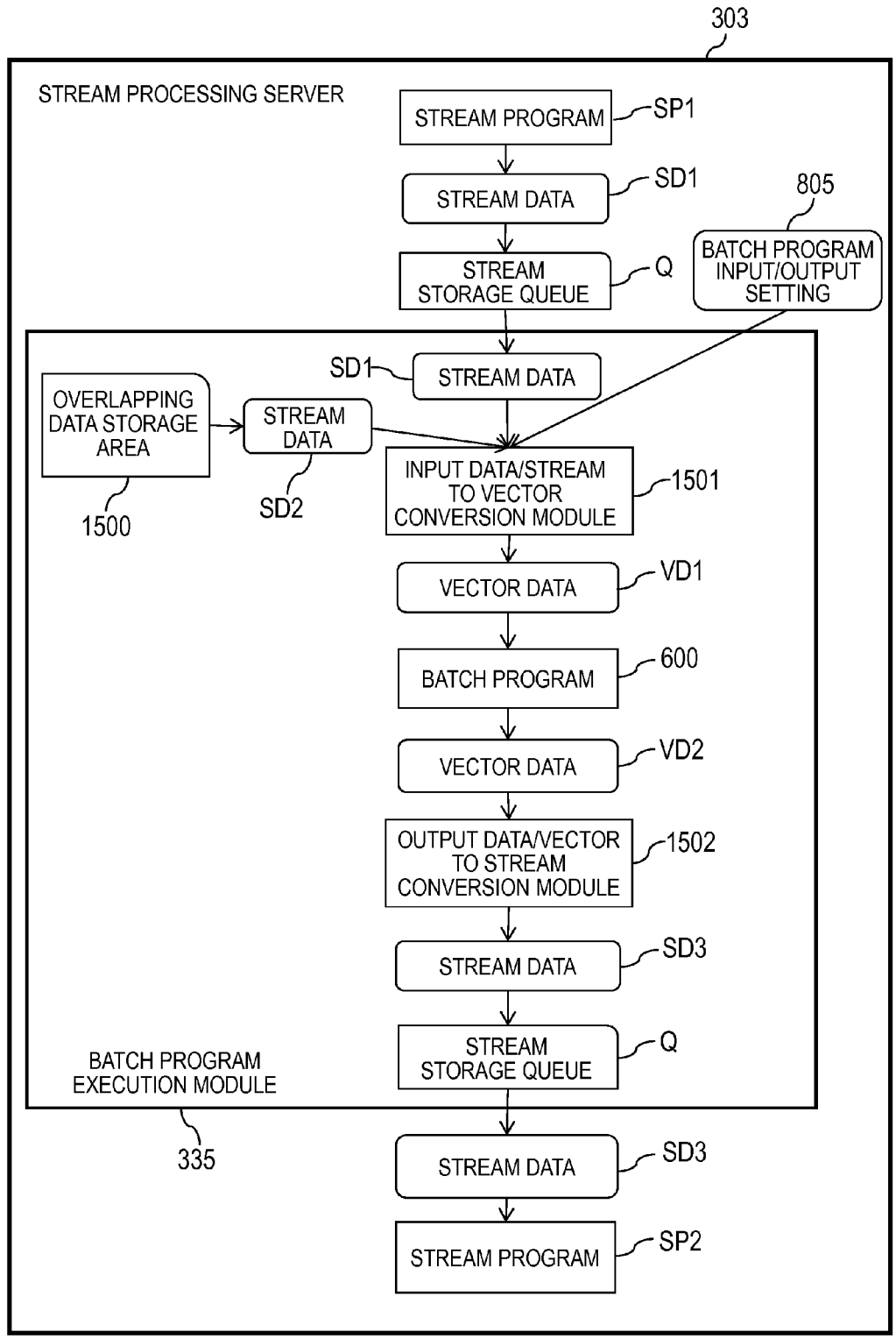
FIG. 15 is an explanatory diagram for illustrating an input/output relationship of the batch program execution module illustrated in FIG. 3.

FIG. 15 is an explanatory diagram for illustrating an input/output relationship of the batch program execution module 335 illustrated in FIG. 3. The batch program execution module 335 includes an input data/stream to vector conversion module 1501 and an output data/vector to stream conversion module 1502. The input data/stream to vector conversion module 1501 inputs the batch program input/output setting 805. The batch program input/output setting 805 may be generated by the first static determination module 804 or the first dynamic determination module 1203, or may be manually created by the user.

Then, the input data/stream to vector conversion module 1501 inputs a plurality of stream data sequences SD1 and SD2 from the stream storage queue Q and an overlapping data storage area 1500, and based on the batch program input/output setting 805, converts the stream data sequences SD1 and SD2 into the vector data VD1. The overlapping data storage area 1500 is an area in which the stream data sequence SD2, which constitutes the latest overlapping width 1402, is stored. A detailed description thereof is given later. The stream data sequence SD1 in the stream storage queue Q may be generated by the stream program 400 or another program.

The batch program 600 inputs the vector data VD1 output by the input data/stream to vector conversion module 1501, and outputs vector data VD2 as a processing result thereof. Then, the output data/vector to stream conversion module 1502 inputs the vector data VD2 output by the batch program 600, and converts the vector data VD2 into a stream data sequence SD3. The stream data sequence SD3 output by the output data/vector to stream conversion module 1502 is stored in the stream storage queue Q. Then, the stream data sequence SD3 in the stream storage queue Q may be input to the stream program 400 or another program.

Figure 16:
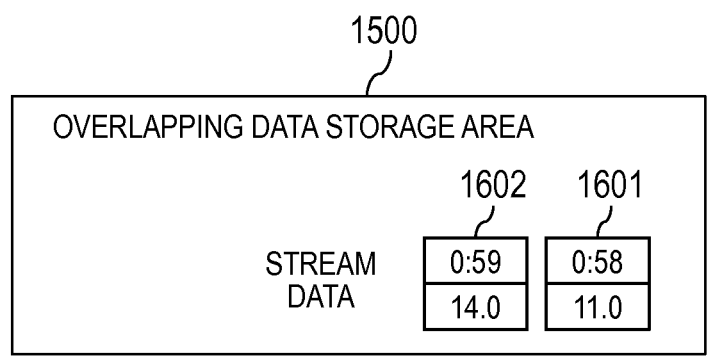
FIG. 16 is an explanatory diagram for illustrating an example of the overlapping data storage area 1500.

FIG. 16 is an explanatory diagram for illustrating an example of the overlapping data storage area 1500. In the overlapping data storage area 1500, the stream data overlapping between next vector data and previous vector data input and used by the batch program 600 is stored. In FIG. 16, in the overlapping data storage area 1500, stream data 1601 including a time "0:58" and a measured value "11.0" and stream data 1602 including a time "0:59" and a measured value "14.0" are stored. The input data/stream to vector conversion module 1501 inputs the stream data held in the overlapping data storage area 1500, and generates the vector data.

<Processing Procedure by Batch Program Input/Output Setting Static Determination Module 332>

Figure 17:
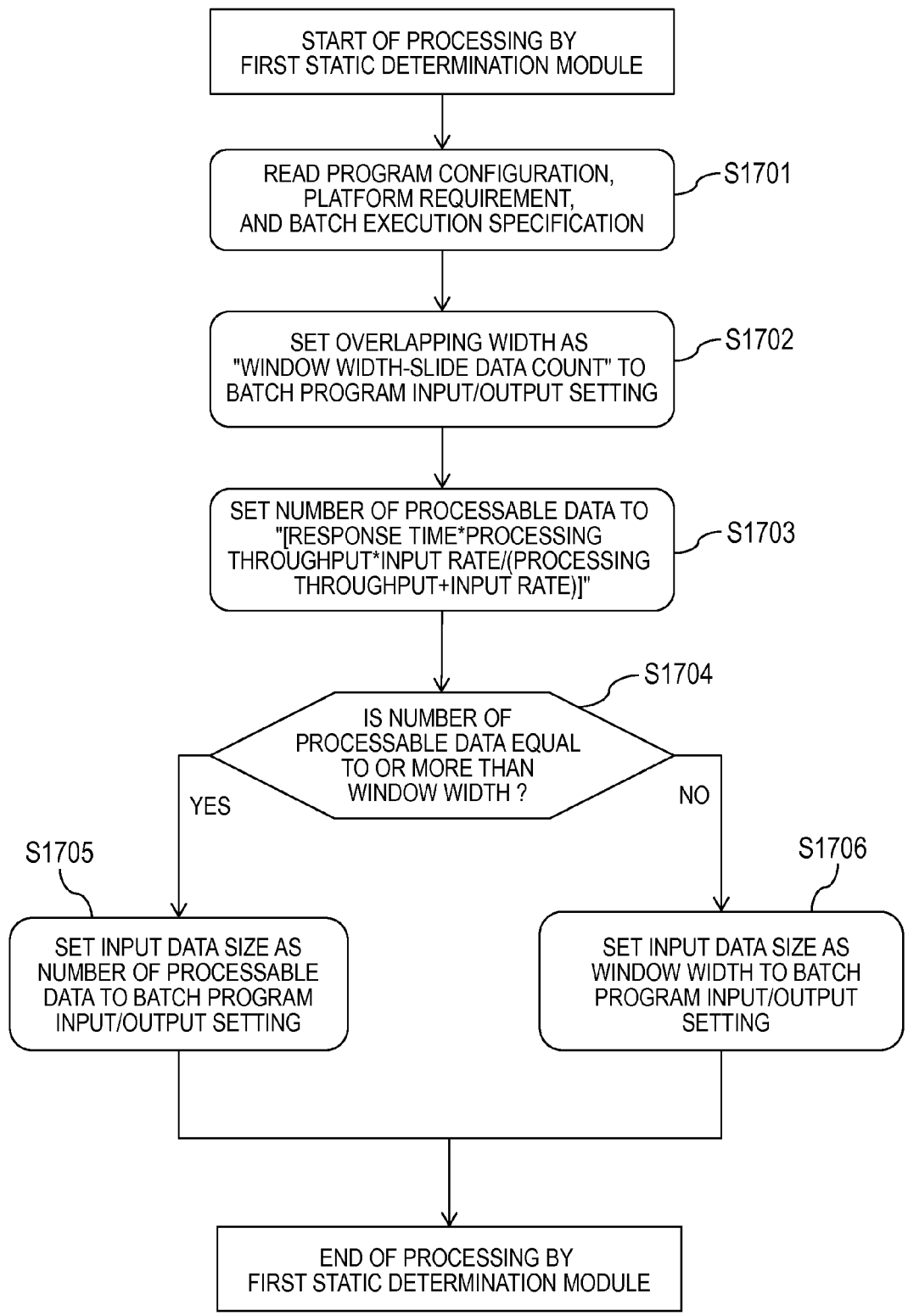
FIG. 17 is a flowchart for illustrating a processing procedure example by the batch program input/output setting static determination module.

FIG. 17 is a flowchart for illustrating a processing procedure example by the batch program input/output setting static determination module 332. The first static determination module 804 first reads the program configuration 801, the platform requirement 802, and the batch execution specification 803 specified by the user (S1701). Then, the first static determination module 804 sets the overlapping width 1402 as "window width-slide data count" to the batch program input/output setting 805 (S1702).

On this occasion, a period until the head data of the stream storage queue Q for storing the stream data to be input to the batch program 600 is processed by the batch program 600 is referred to as "waiting period", and a period of the execution of the processing by the batch program 600 is referred to as "execution period". The first static determination module 804 can satisfy the required response time 1001 when the waiting period+the execution period is equal to or less than the response time 1001.

The waiting period is "number of pieces of data in the stream storage queue Q (hereinafter referred to as "number of queue data")/input rate", and the execution period is "number of queue data/processing throughput". Thus, "number of queue data/input rate+number of queue data/processing throughput" needs to be equal to or less than the response time. The number of pieces of processable data of the stream storage queue Q (hereinafter referred to as "number of processable data") is the maximum number of queue data satisfying "number of queue data/input rate+ number of queue data/processing throughput response time".

Therefore, the number of processable data is [response time×processing throughput×input rate/(processing throughput+input rate)] (Step S1703). It should be noted that [ ] is the Gauss symbol.

When the number of processable data is equal to or more than the window width 901 (Yes in S1704), the first static determination module 804 sets the input data size 1401 as the number of processable data to the batch program input/output setting 805 (Step S1705). As a result, while the requirement of the response time 1001 is satisfied, the input data size 1401 can be maximized. On the other hand, when the number of processable data is less than the window width 901 (No in Step S1704), the batch program 600 cannot process the vector data VD including elements less than the window width 901, and hence the first static determination module 804 sets the input data size 1401 to the window width 901, and sets the calculated input data size 1401 and overlapping width 1402 to the batch program input/output setting 805 (S1706).

For example, when the window width 901 is 4 and the slide data count 902 is 2 as illustrated in FIG. 9, when the response time 1001 is 16 seconds as illustrated in FIG. 10, and when the input rate 1101 is 1/second and the processing throughput 1102 is 1/second as illustrated in FIG. 11, the number of processable data is 16[second]×1[per second]×1 [per second]/(1[per second]+1[per second])=8. Thus, the window width 901 is 4, and the number of processable data is thus more than the window width 901, and the input data size 1401 becomes the number of processable data, 8. Moreover, the overlapping width 1402 is "window width 901-slide data count 902"=4−2=2. In this way, the batch program input/output setting 805 illustrated in FIG. 14 is generated.

<Processing Procedure by Batch Execution Monitoring Module 1201>

Figure 18:
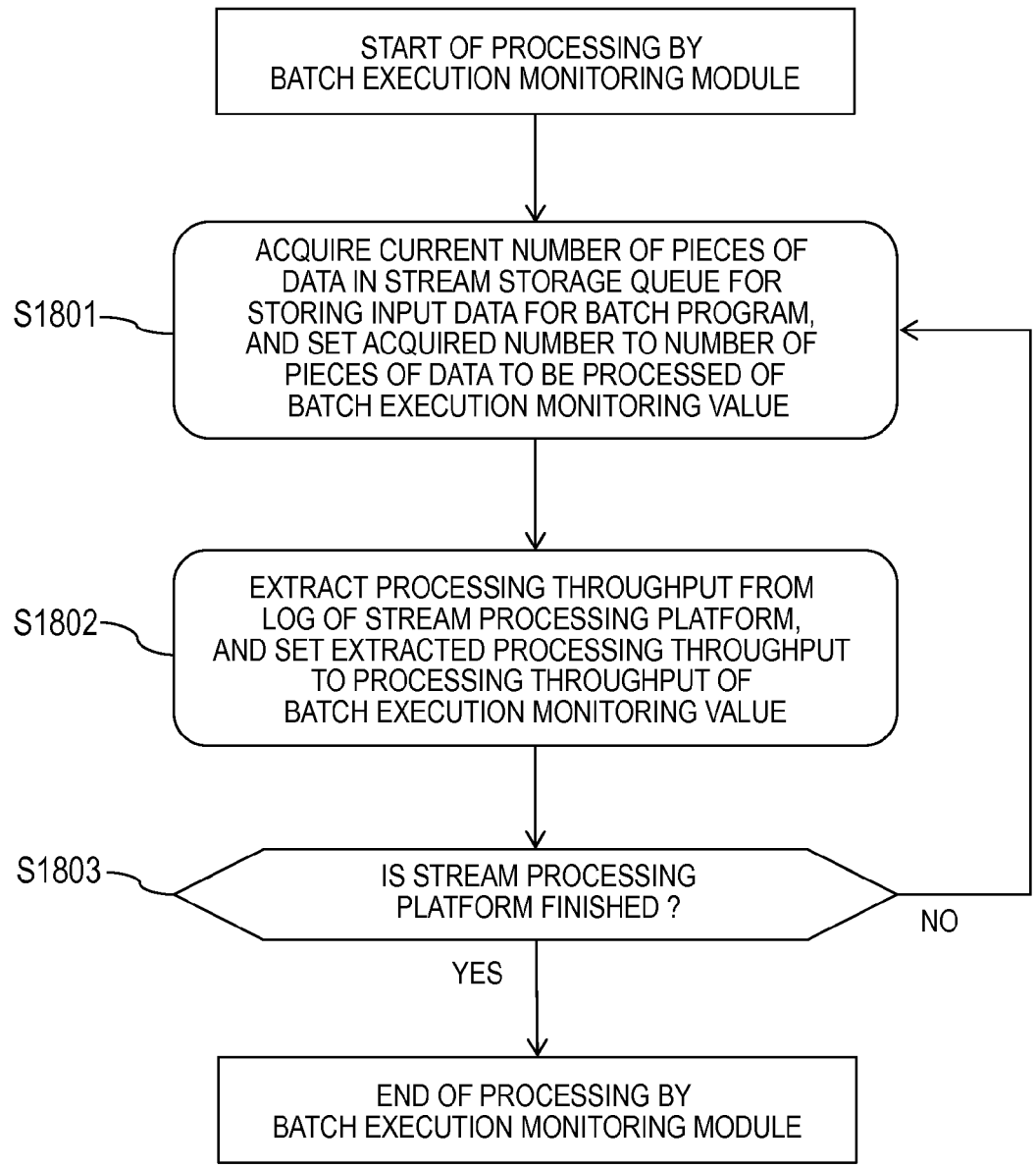
FIG. 18 is a flowchart for illustrating a processing procedure example by the batch execution monitoring module.

FIG. 18 is a flowchart for illustrating a processing procedure example by the batch execution monitoring module 1201. The batch execution monitoring module 1201 acquires the current number of pieces of data in the stream storage queue Q for storing the stream data to be input to the batch program 600, and sets the batch execution monitoring value 1202 to the number of pieces of data to be processed 1301 (S1801). Then, the batch execution monitoring module 1201 extracts the processing throughput 1102 from a log of the stream processing platform 321, and sets the extracted processing throughput 1102 to the processing throughput 1102 of the batch execution monitoring value 1202 (S1802). Then, when the stream processing platform 321 is not finished (No in Step S1803), the batch execution monitoring module 1201 returns to Step S1801, and when the stream platform 321 is finished (Yes in Step S1803), the batch execution monitoring module 1201 finishes the processing.

<Processing Procedure by First Dynamic Determination Module 1203>

Figure 19:
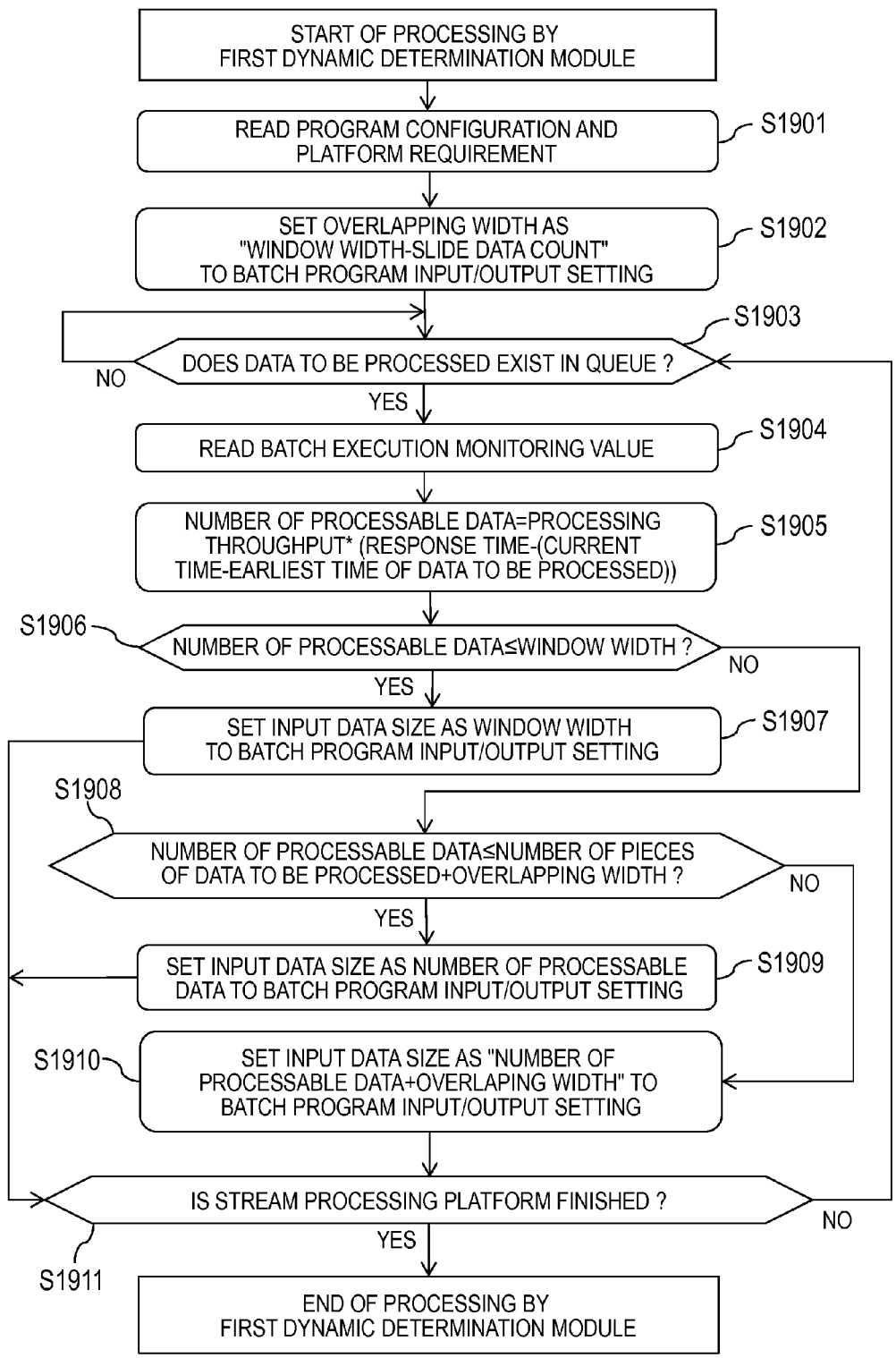
FIG. 19 is a flowchart for illustrating a processing procedure example by the first dynamic determination module.

FIG. 19 is a flowchart for illustrating a processing procedure example by the first dynamic determination module 1203. The first dynamic determination module 1203 first reads the program configuration 801 and the platform requirement 802 (S1901). Then, the first dynamic determination module 1203 sets the overlapping width 1402 as "window width 901-slide data count" to the batch program input/output setting 805 (S1902).

Then, the first dynamic determination module 1203 waits for the input of the stream data to be processed to the stream storage queue Q (No in Step S1903). When the stream data to be processed exists in the stream storage queue Q (Yes in Step S1903), the first dynamic determination module 1203 reads the batch execution monitoring value 1202 (S1904). Then, the first dynamic determination module 1203 sets, based on the response time 1001, the processing throughput 1102, the current time, and the earliest time of the data in the stream storage queue Q, the maximum number of pieces of stream data (hereinafter "number of processable data") satisfying the response time 1001 to "processing throughput×(response time-(current time-earliest time of data to be processed))" (S1905).

Then, when the number of processable data is equal to or less than the window width 901 (Yes in Step S1906), the batch program 600 cannot process the vector data VD having elements less than the window width 901, the first dynamic determination module 1203 sets the input data size 1401 to the window width 901, and sets the window width to the batch program input/output setting 805 (S1907). Then, the first dynamic determination module 1203 transitions to Step S1911.

On the other hand, when the number of processable data is more than the window width 901 (No in Step S1906), the first dynamic determination module 1203 determines whether the number of processable data is equal to or less than the number of pieces of data to be processed 1301+ overlapping width 1402 (Step S1908). When the number of processable data is equal to or less than the number of pieces of data to be processed+overlapping width (Yes in Step S1908), the first dynamic determination module 1203 sets the input data size 1401, as the number of processable data, to the batch program input/output setting 805 (S1909). Then, the first dynamic determination module 1203 transitions to Step S1911.

When the number of processable data is not equal to or less than the number of pieces of data to be processed+ overlapping width (No in Step S1908), the first dynamic determination module 1203 sets the input data size 1401, as "the number of processable data+overlapping width 1402", to the batch program input/output setting 805 (S1910). Then, the first dynamic determination module 1203 transitions to Step S1911.

In Step S1911, the first dynamic determination module 1203 determines whether the stream processing platform 321 is finished or not (Step S1911), and when the stream processing platform 321 is not finished (No in Step S1911), returns to Step S1903. On the other hand, when the stream processing platform 321 is finished (Yes in Step S1911), the processing by the first dynamic determination module 1203 is finished.

<Processing Procedure by Input Data/Stream to Vector Conversion Module 1501>

Figure 20:
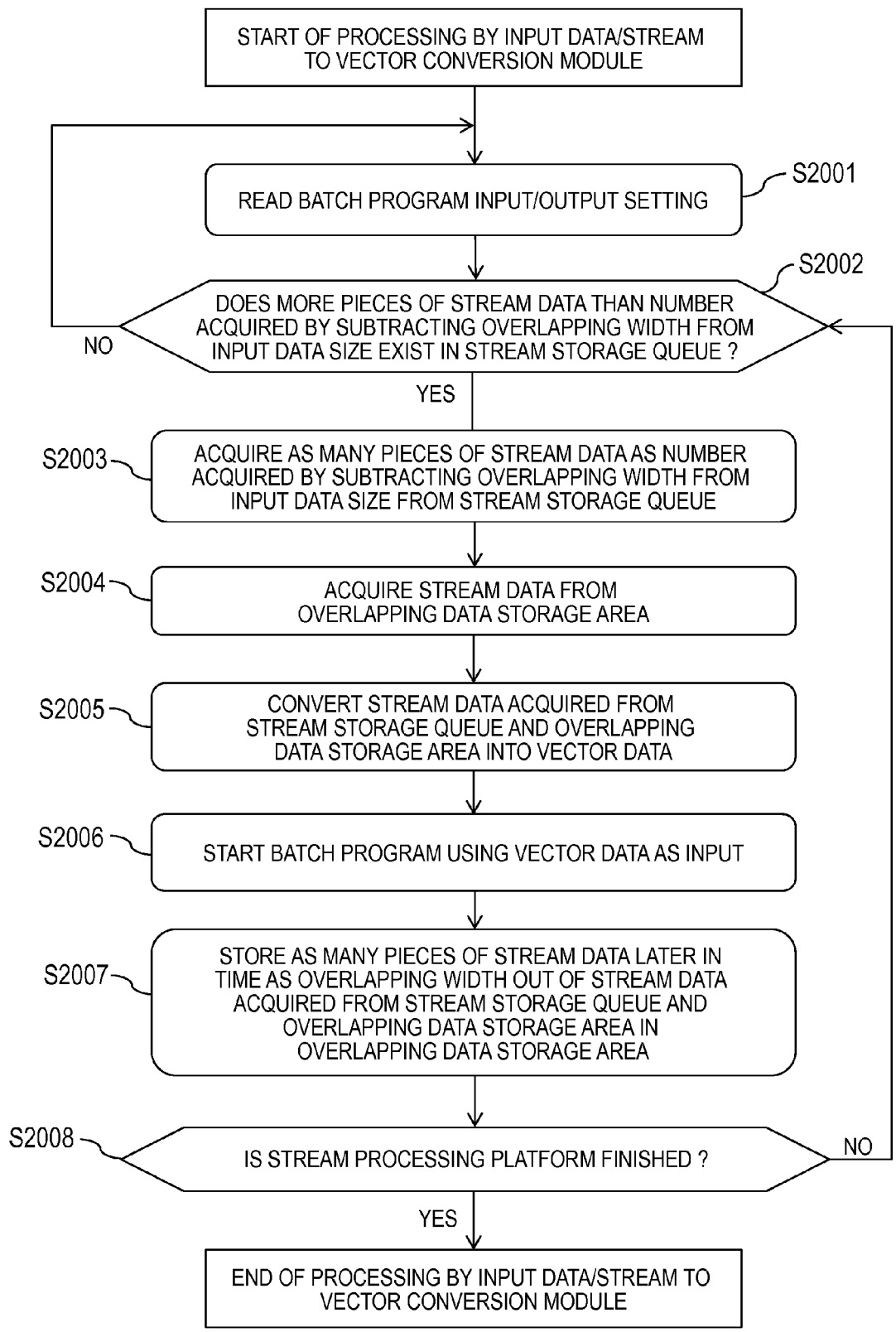
FIG. 20 is a flowchart for illustrating a processing procedure by the input data/stream to vector conversion module.

FIG. 20 is a flowchart for illustrating a processing procedure by the input data/stream to vector conversion module 1501. The input data/stream to vector conversion module

1501 reads the batch program input/output setting (S2001). Then, the input data/stream to vector conversion module 1501 determines whether or not pieces of stream data equal to or more than a number acquired by subtracting the overlapping width 1402 from the input data size 1401 exist in the stream storage queue Q (Step S2002).

When pieces of stream data equal to or more than the number acquired by subtracting the overlapping width 1402 from the input data size 1401 do not exist (No in Step S2002), the input data/stream to vector conversion module 1501 returns to Step S2001, and waits until the stream data is accumulated. When pieces of stream data equal to or more than the number acquired by subtracting the overlapping width 1402 from the input data size 1401 exist (Yes in Step S2002), the input data/stream to vector conversion module 1501 acquires pieces of stream data as many as the number acquired by subtracting the overlapping width 1402 from the input data size 1401 from the stream storage queue Q (S2003).

Then, the input data/stream to vector conversion module 1501 acquires the stream data from the overlapping data storage area 1500 (S2004). The input data/stream to vector conversion module 1501 converts the stream data acquired from the stream storage queue Q and the overlapping data storage area 1500 to vector data VD (S2005), and uses the vector data VD as input thereby to invoke the batch program 600 (S2006). Then, the input data/stream to vector conversion module 1501 stores pieces of stream data later in time as many as the overlapping width 1402 out of the stream data acquired from the stream storage queue Q and the overlapping data storage area 1500 in the overlapping data storage area 1500 (S2007).

Then, the input data/stream to vector conversion module 1501 determines whether the stream processing platform 321 is finished or not (Step S2008), and when the stream processing platform 321 is not finished (No in Step S2008), returns to Step S2002. On the other hand, when the stream processing platform 321 is finished (Yes in Step S2008), the processing by the input data/stream to vector conversion module 1501 is finished.

<Conversion Example from Stream Data to Vector Data VD>

Figure 21:
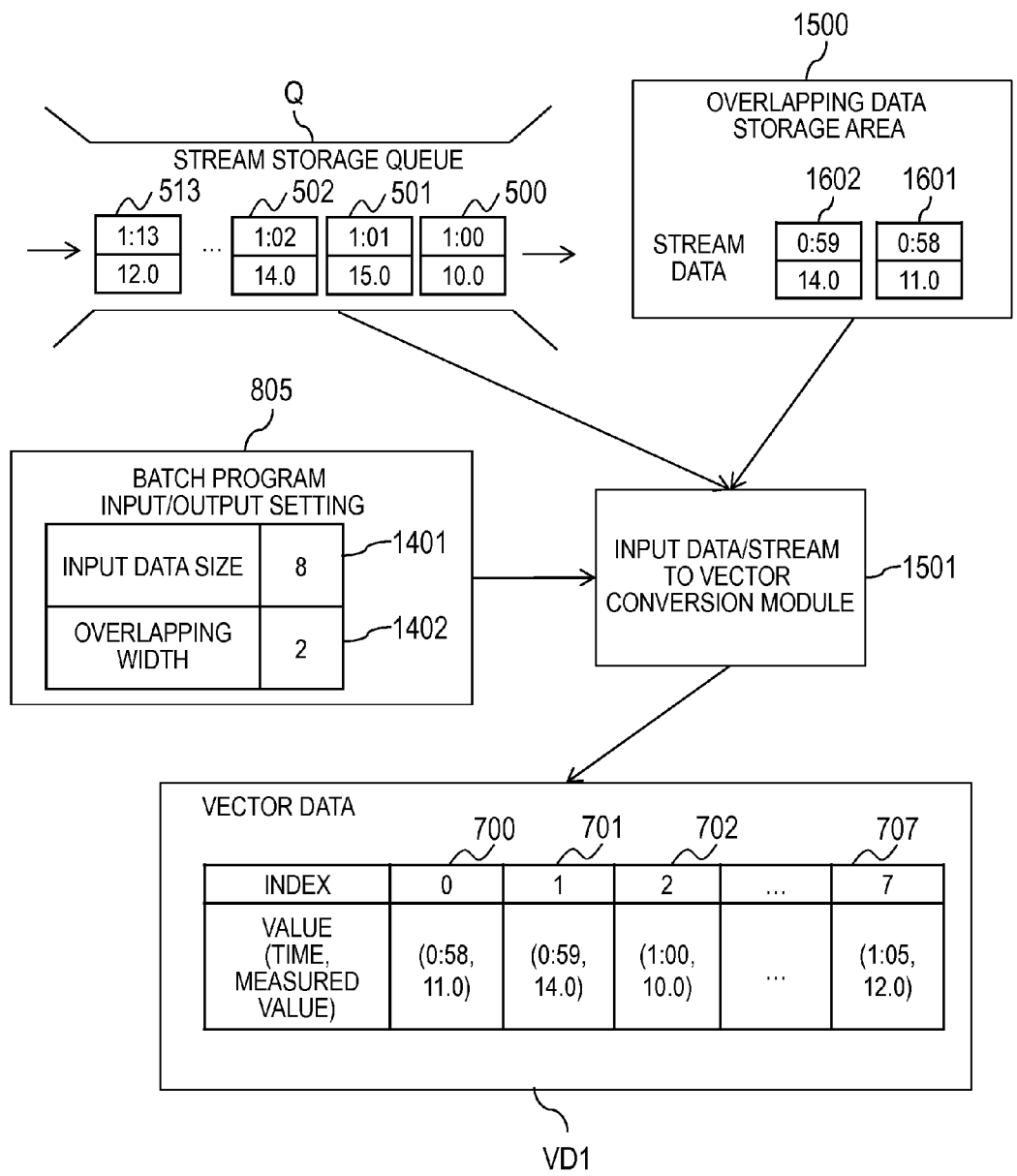
FIG. 21 is an explanatory diagram for illustrating a conversion example from stream data to vector data.

FIG. 21 is an explanatory diagram for illustrating a conversion example from stream data to vector data VD. A description is given of FIG. 21 referring to the step numbers in FIG. 20. In Step S2001, the input data/stream to vector conversion module 1501 reads the batch program input/output setting 805 in which the input data size 1401 is 8 and the overlapping width 1402 is 2.

In Step S2002, the input data/stream to vector conversion module 1501 determines whether or not pieces of stream data equal to or more than the number acquired by subtracting the overlapping width 1402 from the input data size 1401 exist in the stream storage queue Q. The number acquired by subtracting the overlapping width 1402 (2) from the input data size 1401 (8) is 8−2=6. 14 pieces of stream data 500 to 513 from a time 1:00 to a time 1:13 are stored in in the stream storage queue Q, and the piece of stream data equal to more than the number (6) acquired by subtracting the overlapping width 1402 (2) from the input data size 1401 (8) are thus stored.

Thus, in Step S2003, the input data/stream to vector conversion module 1501 acquires the five pieces of stream data 501 to 505 from the time 1:00 to the time 1:05 from the stream storage queue Q.

Moreover, in Step S2004, the input data/stream to vector conversion module 1501 acquires the pieces of stream data 1601 and 1602 at the time 0:58 and the time 0:59 from the overlapping data storage area 1500. Then, in Step S2005, the input data/stream to vector conversion module 1501 convers the pieces of stream data 1601 and 1602 at the time 0:58 and the time 0:59 and the six pieces of stream data 501 to 505 from the time 1:00 to the time 1:05 into vector data VD1 including elements 700 to 707 indicated by indices 0 to 7.

Moreover, in Step S2007, the input data/stream to vector conversion module 1501 selects two pieces of stream data corresponding to the overlapping width 1402 later in time out of the eight pieces of the acquired stream data from the time 0:59 to the time 1:05. In this case, two pieces of stream data at the time 1:04 and the time 1:05 are selected.

Then, the input data/stream to vector conversion module 1501 stores, by overwriting, the two pieces of stream data at the time 1:04 and the time 1:05 in the overlapping data storage area 1500. As a result, in the overlapping data storage area 1500, in place of the stream data corresponding to the time 0.58 and the time 0:59, the pieces of stream data corresponding to the time 1:04 and the time 1:05 are stored. Thus, when the stream data is newly acquired in Step S2003, in Step S2004, the pieces of stream data at the time 1:04 and the time 1:05 are acquired from the overlapping data storage area 1500.

<Processing Procedure by Output Data/Vector to Stream Conversion Module 1502>

Figure 22:
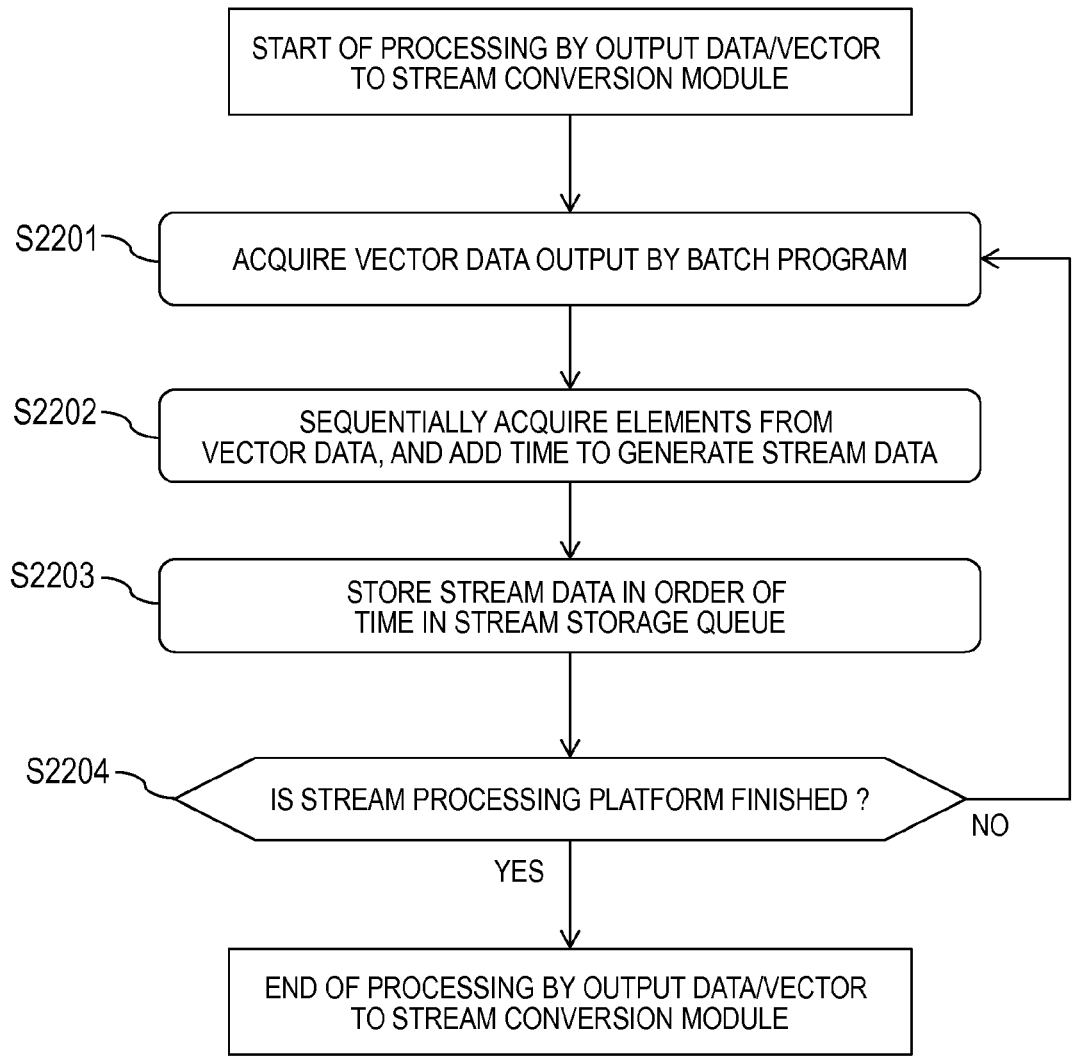
FIG. 22 is a flowchart for illustrating a processing procedure example by the output data/vector to stream conversion module.

FIG. 22 is a flowchart for illustrating a processing procedure example by the output data/vector to stream conversion module 1502. The output data/vector to stream conversion module 1502 acquires the vector data VD output by the batch program 600 (S2201). Then, the output data/vector to stream conversion module 1502 sequentially acquires the elements from the vector data VD, and adds the time to the acquired element to generate the stream data (Step S2202).

Then, the output data/vector to stream conversion module 1502 stores the generated stream data in the stream storage queue Q in the order of the time (S2203). Then, the output data/vector to stream conversion module 1502 determines whether or not the stream processing platform 321 is finished (Step S2204), and when the stream processing platform 321 is not finished (No in Step S2204), the processing procedure returns to Step S2201. On the other hand, when the stream processing platform 321 is finished (Yes in Step S2204), the processing by the output data/vector to stream conversion module 1502 is finished.

<Conversion Example from Vector Data VD into Stream Data>

Figure 23:
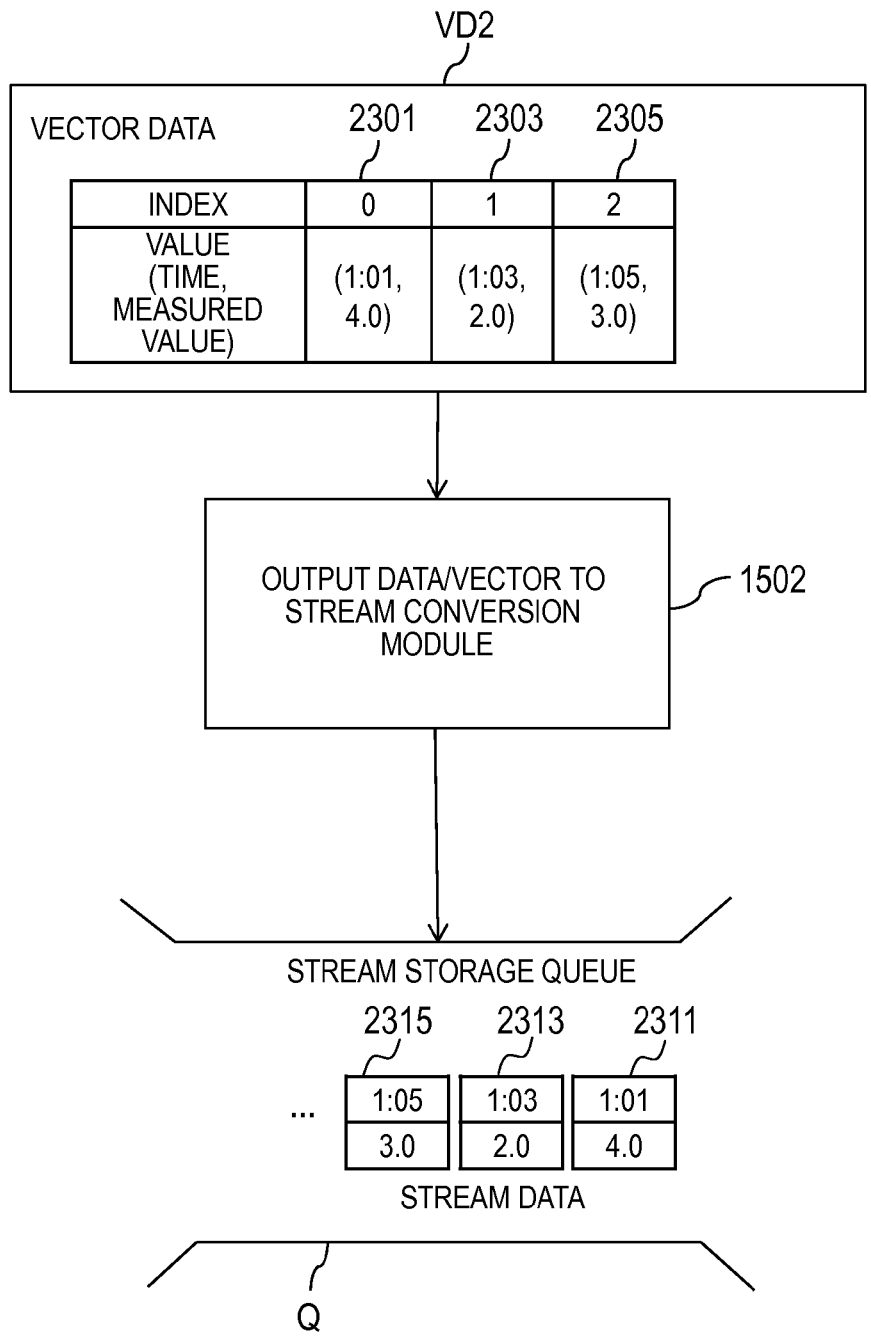
FIG. 23 is an explanatory diagram for illustrating a conversion example from vector data into stream data.

FIG. 23 is an explanatory diagram for illustrating a conversion example from vector data VD into stream data. A description is given of FIG. 23 referring to the step numbers in FIG. 22. In Step S2201, the output data/vector to stream conversion module 1502 acquires vector data VD2 including elements indicated by indices 0 to 2.

Then, in Step S2202 and Step S2203, the output data/vector to stream conversion module 1502 generates pieces of stream data 2311, 2313, and 2315 at times 1:01, 1:03, and 1:05 corresponding to the elements, and stores the stream data in the stream storage queue Q. As a result, the subsequent stream program 400 can acquire the stream data 2311, 2313, and 2315 stored in the stream storage queue Q to carry out the stream processing.

In this way, according to the first embodiment, overlapping between the pieces of vector data avoids the calculation execution inability and maintains the semantics of the batch program. Thus, without changing a code and an algorithm of the batch program, the batch program 600 can be executed on the stream processing platform 321. Moreover, the data size of the vector data VD is determined so that only the pieces of data corresponding to the overlapping width 1402 overlap. This suppresses the generation of vector data VD exceeding the overlapping width 1402 and reduces a processing load.

Moreover, after the execution of the batch program 600 on the stream processing platform 321, the stream data group, which is the execution result, is collectively converted into the vector data, and hence the vector data can be provided as the input data to the subsequent stream data to be executed on the stream processing platform 321. Consequently, efficiency of the stream processing can be increased on the stream processing platform 321.

(Second Embodiment)

A description is now given of a second embodiment of this invention. The second embodiment is an example in which the stream program 400 is executed on the batch processing platform. It should be noted that like components are denoted by like numerals as in the first embodiment, and a description thereof is therefore omitted.

Figure 24:
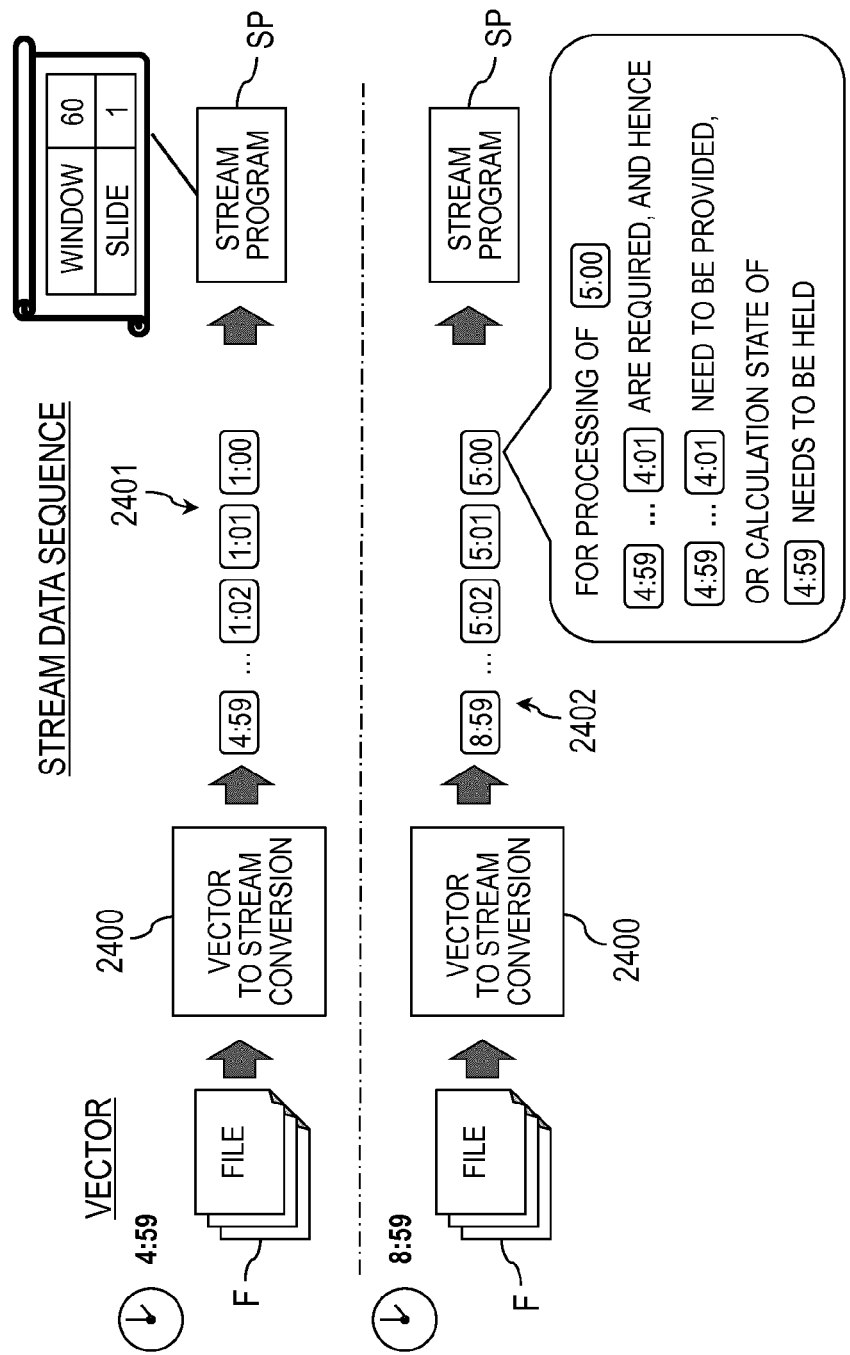
FIG. 24 is an explanatory diagrams for illustrating an example in which a stream program is executed on the batch processing platform.
Figure 25:
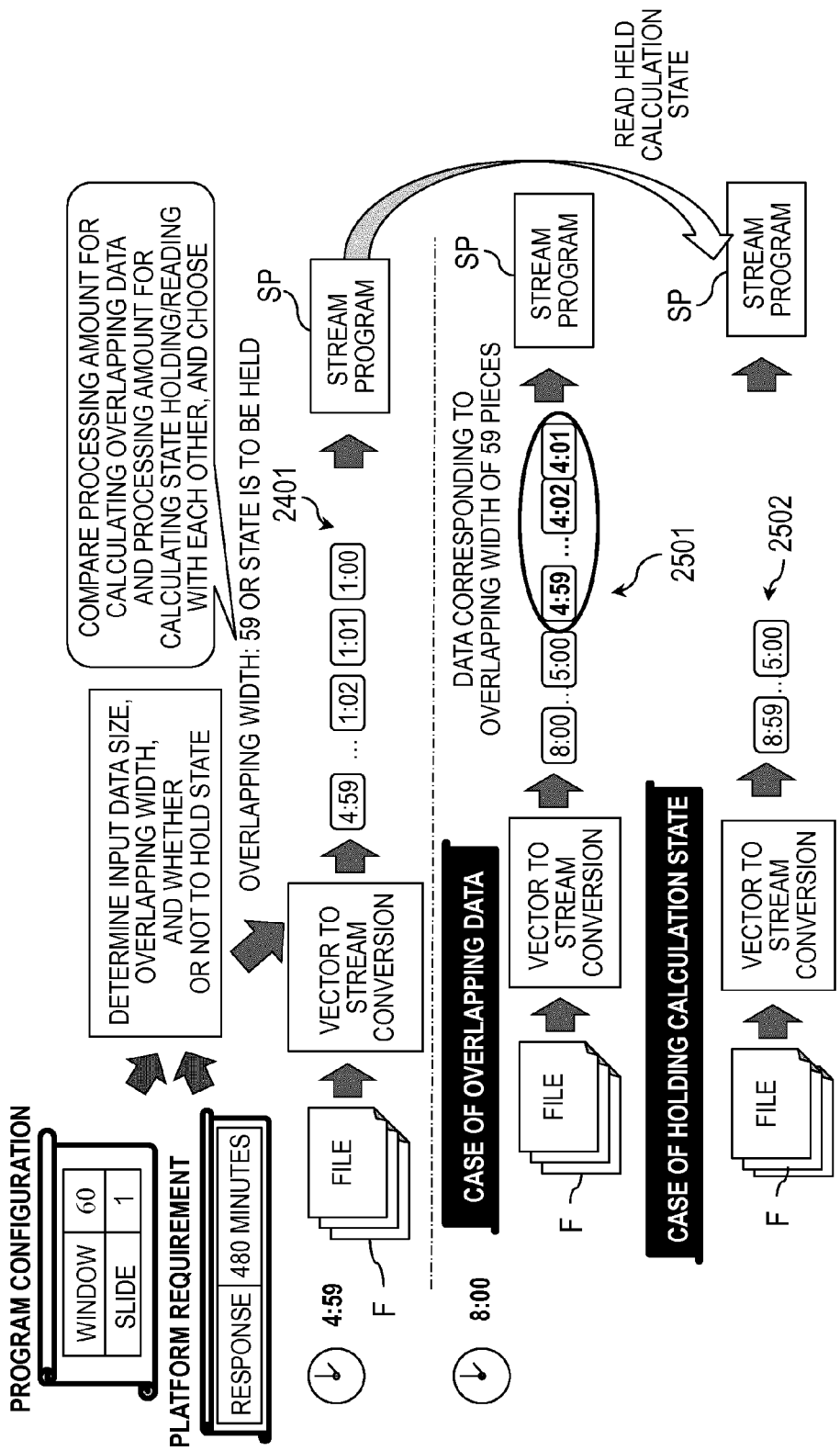
FIG. 25 is an explanatory diagrams for illustrating an example in which a stream program is executed on the batch processing platform.

FIG. 24 and FIG. 25 are explanatory diagrams for illustrating examples in which a stream program SP is executed on the batch processing platform. FIG. 24 is a diagram for illustrating an execution example in a case in which pieces of data do not overlap. In FIG. 24, the stream program SP has such a program configuration that the window width is 60 and the slide data count is 1. It should be noted that the unit of time is, for example, "minute". Moreover, for example, the batch processing platform carries out the batch processing every four hours.

The batch processing platform carries out the vector to stream conversion 2400 for the batch processing platform for converting a value of each time in a file F into stream data at each time as a unit. A converted stream data sequence 2401 is input to the stream program SP. The stream program SP carries out predetermined processing while sliding the input stream data sequence 2401 by one at a time.

An overlap is not provided between the pieces of data, and hence after the conversion at a time 4:59, when the batch processing is carried out at 8:59, the batch processing platform carries out the vector to stream conversion 2400 so as to avoid the overlap on the data at the previous time 4:59. In other words, at the time 8:59, the batch processing platform carries out the vector to stream conversion on the values at the times from 5:00 to 8:59, to thereby generate the stream data sequence 2402.

On this occasion, the stream data at the time 5:00 is the head data in the vector to stream conversion at the time 8:59. Thus, when the stream data at the time 5:00 is input to the stream program SP, 59 pieces of stream data from the time 4:01 to the time 4:59 are not available, and the stream program SP cannot carry out the predetermined processing for the stream data at the time 5:00. Thus, when the stream program SP processes the stream data at the time 5:00, 59 pieces of stream data immediately before need to be provided, or a calculation state of the stream data at the time 4:59 needs to be held.

FIG. 25 is a diagram for illustrating an execution example of a case in which the overlap is provided between the pieces of data. The program configuration of the stream program SP is the same as that of FIG. 24. Moreover, the platform requirement for the stream program SP is 480 minutes.

The batch processing platform determines the overlapping width or the necessity of the calculation state holding based on the program configuration and the platform requirement. The batch processing platform selects which of the overlapping width and the calculation state holding is to be applied, based on a comparison between calculation processing amounts thereof. When the overlapping width is applied, the batch processing platform uses the vector to stream conversion 2400 to covert data including data corresponding to the overlapping width into stream data.

For the case of the time 8:59, the vector to stream conversion 2400 in FIG. 24 generates the stream data sequence 2402 for the times 5:00 to 8:59, but the vector to stream conversion 2400 in FIG. 25 generates a stream data sequence 2501 for times 4:01 to 8:00 including the stream data corresponding to the overlapping width corresponding to the 59 pieces of data immediately before the time 5:00. It should be noted that stream data for the times 8:01 to 8:59, which has not been generated, is generated at the next timing of the batch processing.

Moreover, when the calculation state holding is applied, the calculation state of the stream program SP at the time 4:59 is held. Moreover, the vector to stream conversion 2400 generates stream data 2502 for the time 5:00 to the time 8:59 as in FIG. 24 at the time 8:59, and outputs the stream data 2502 to the stream program SP. The stream program SP uses the calculation state of the stream program SP at the time 4:59 and the stream data sequence 2502 for the time 5:00 to the time 8:59 to carry out the predetermined processing.

Pieces of the stream data substantially overlap by using the execution result of the stream processing at the previous batch processing in this way. This avoids the inability of the calculation as in the example of FIG. 24 and maintains the semantics of the stream program 400.

<System Configuration Example>

Figure 26:
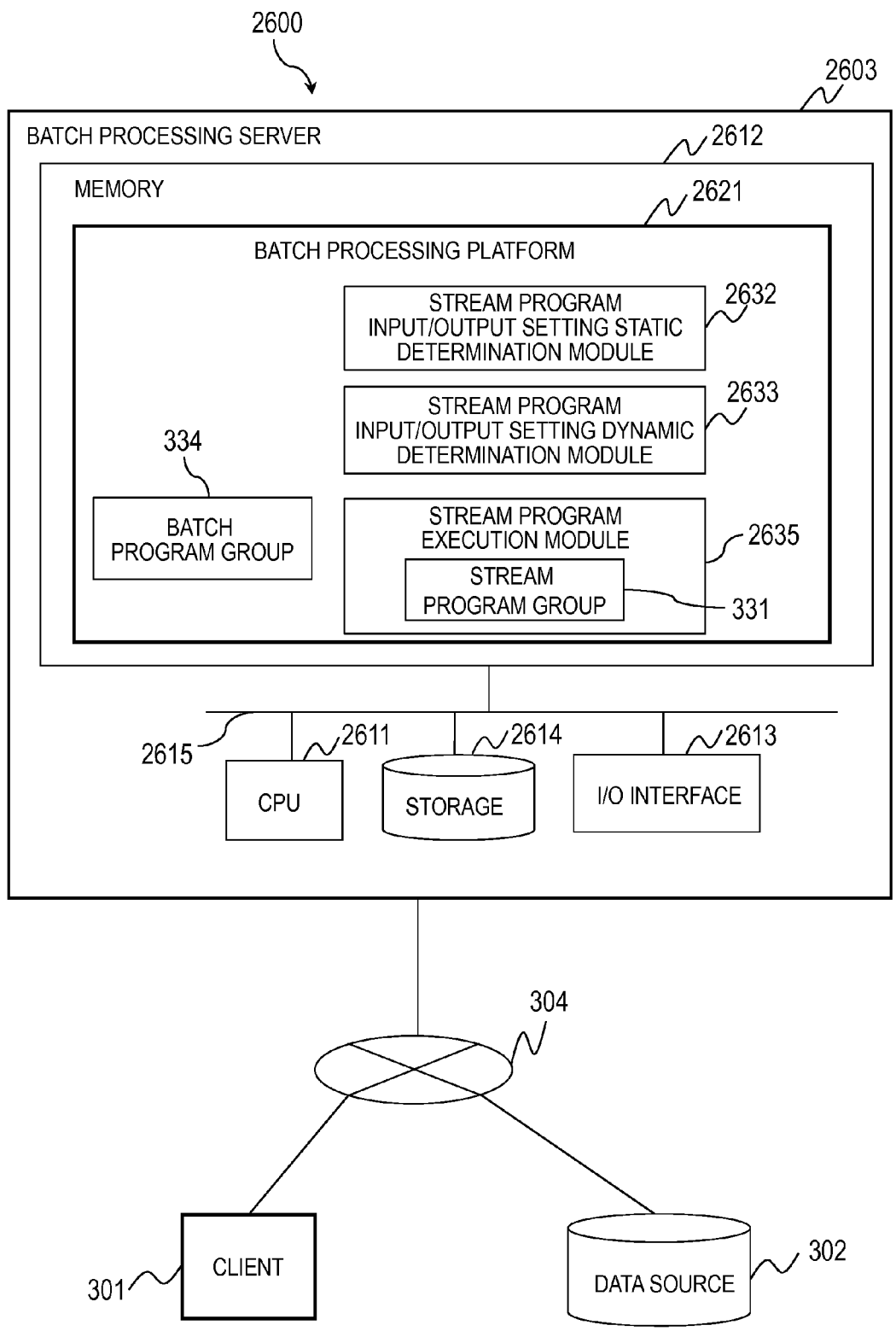
FIG. 26 is a system configuration diagram for illustrating an example of a batch processing system.

FIG. 26 is a system configuration diagram for illustrating an example of a batch processing system. A batch processing system 2600 has such a configuration that a client 301, a data source 302, and a batch processing server 2603 are communicably coupled to one another over a network 304. The network 304 may be the Ethernet (trademark), a LAN, or a WAN. Moreover, the client 301, the data source 302, and the batch processing server 2603 may be arbitrary computers such as PCs and blade computer systems.

The client 301 is a computer for carrying out registration processing for the batch processing server 2603. The registration processing is described in detail later.

The data source 302 is a supply source for supplying a series of time-series data to be processed to the batch processing server 2603, and examples of the data source 302 include the above-mentioned factory plant and server.

The batch processing server 2603 is a computer in which an I/O interface 2613, a CPU 2611, a memory 2612, and a storage 2614 are coupled to one another via a bus 2615. The batch processing server 2603 makes access to the network 304 via the I/O interface 2613. Moreover, the batch processing server 2603 can store a processing result, an intermediate result of processing, and setting data required for a system operation in the nonvolatile storage 2614. The storage 2614 is directly coupled via the I/O interface 2613, but may be coupled via the I/O interface 2613 and the network 304 outside the batch processing server 2603.

A batch processing platform 2621 is mapped to the memory 2612. The batch processing platform 2621 is middleware to which modules for general stream processing are mapped. The modules for general stream processing are at least one stream program such as a start/stop module and a scheduling module in a batch program group 334. Moreover, the following modules are mapped to the batch processing platform 2621. Specifically, the modules include a stream program input/output setting static determination module 2632, a stream program input/output setting dynamic determination module 2633, and a stream program execution module 2635 including a stream program group 331, which is at least one stream program.

<Stream Program Input/Output Setting Static Determination Module 2632>

Figure 27:
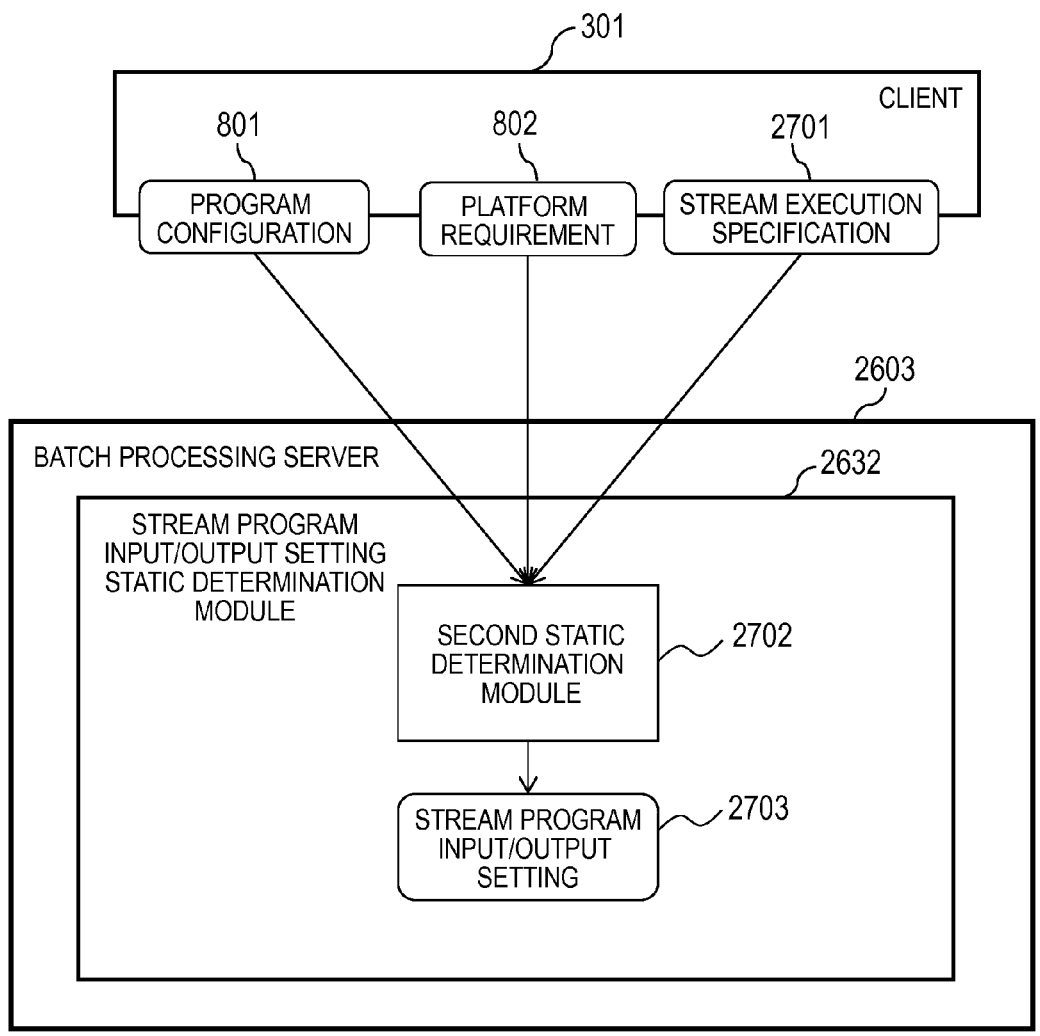
FIG. 27 is an explanatory diagram for illustrating an input/output relationship of the stream program input/output setting static determination module 2632 illustrated in FIG. 26.

FIG. 27 is an explanatory diagram for illustrating an input/output relationship of the stream program input/output setting static determination module 2632 illustrated in FIG. 26. The stream program input/output setting static determination module 2632 is a program executed by the CPU 2611 on the batch processing platform 2621, and determines a static input/output setting of the stream program 400. The stream program input/output setting static determination module 2632 includes a second static determination module 2702.

The second static determination module 2702 receives registration information such as a program configuration 801, a platform requirement 802, and a stream execution specification 2701 from the client 301. Then, the second static determination module 2702 determines a static input data size, overlapping width, and necessity of calculation state holding of the stream program 400. The calculation state holding is to hold the calculation state, which is an execution result of the stream program 400 executed on the batch processing platform 2621. The determined input data size and overlapping width are output as a stream program input/output setting 2703.

<Stream Execution Specification 2701>

Figure 28:
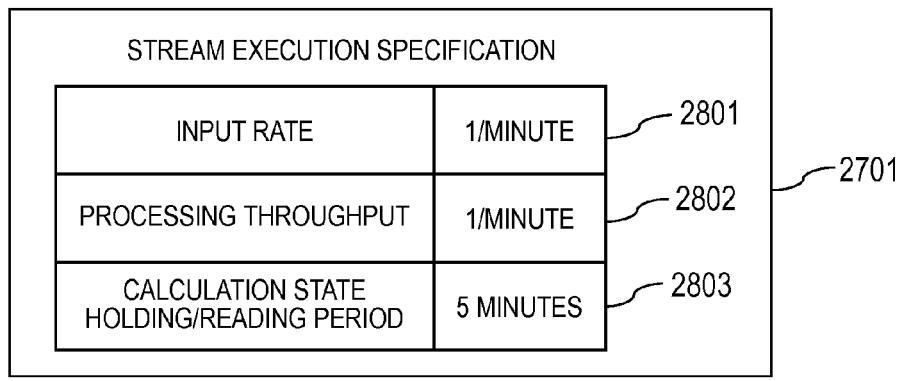
FIG. 28 is an explanatory diagram for illustrating an example of the stream execution specification 2701.

FIG. 28 is an explanatory diagram for illustrating an example of the stream execution specification 2701. The stream execution specification 2701 is information defining an execution method of the stream processing. Examples of the parameters include an input rate 2801, a processing throughput 2802, and a calculation state holding/reading period 2803, and the parameters are specified by the user operating the client 301. The input rate 2801 represents an interval of an arrival of the element of vector data VD input to the stream program 400.

In FIG. 28, the input rate 2801 is 1/minute, which represents that one element of the vector data VD arrives per minute. Moreover, the processing throughput 2802 is the number of pieces of stream data processed by the stream program 400 per unit time. In FIG. 28, the processing throughput 2802 is 1/minute, which represents that the stream program 400 can process one value per minute. The calculation state holding/reading period 2803 represents a period required for holding and reading the calculation state. In FIG. 28, the calculation state holding/reading period 2803 is 5 minutes, which represents that the holding and reading of the calculation state takes 5 minutes.

<Stream Program Input/Output Setting Dynamic Determination Module 2633>

Figure 29:
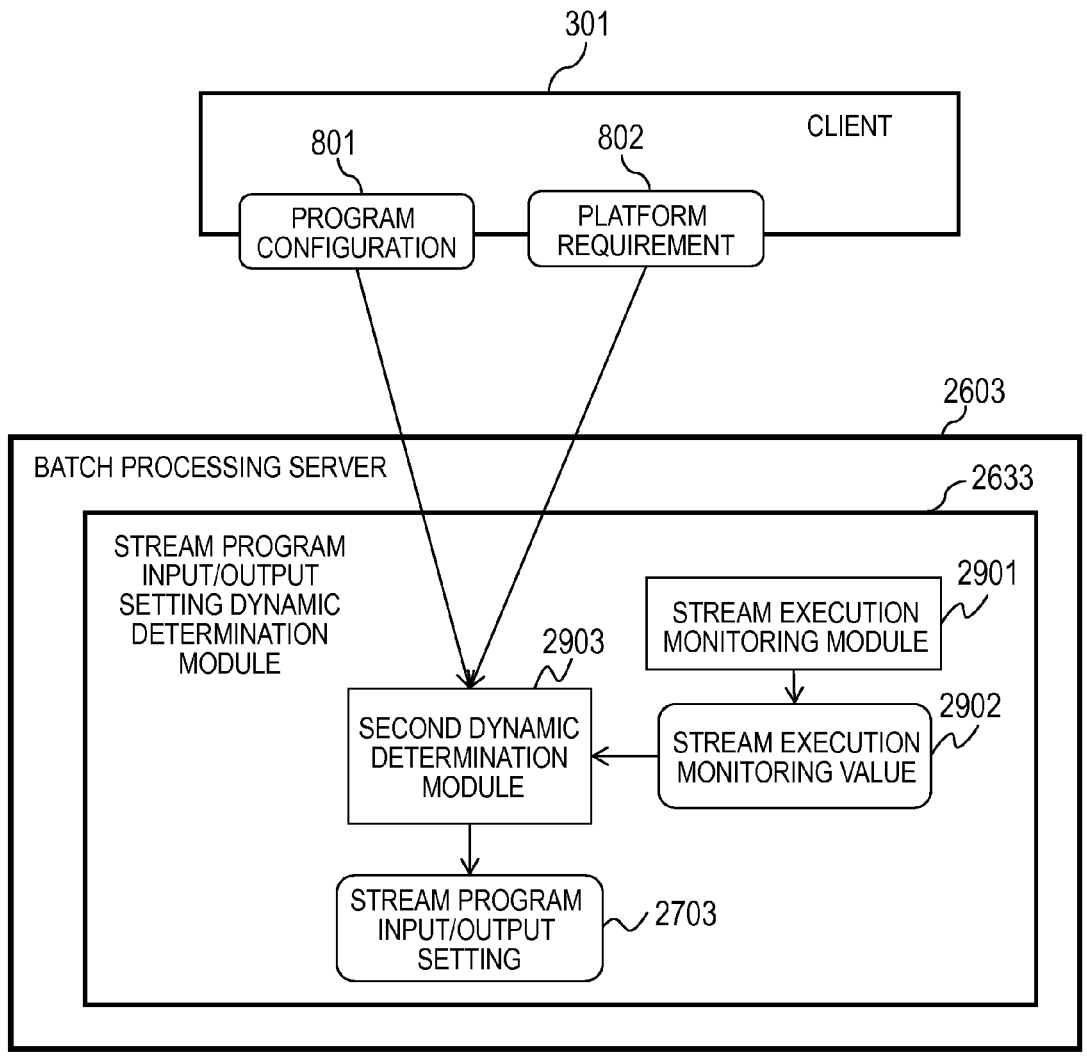
FIG. 29 is an explanatory diagram for illustrating an input/output relationship of the stream program input/output setting dynamic determination module 2633 illustrated in FIG. 26.

FIG. 29 is an explanatory diagram for illustrating an input/output relationship of the stream program input/output setting dynamic determination module 2633 illustrated in FIG. 26. The stream program input/output dynamic determination module 2633 is a program executed by the CPU 2611 on the batch processing platform 2621, and determines dynamic input/output setting for the stream program 400. The stream program input/output setting dynamic determination module 2633 includes a stream execution monitoring module 2901 and a second dynamic determination module 2903.

The stream execution monitoring module 2901 monitors the running stream program 400, and generates a stream execution monitoring value 2902. The stream execution monitoring value 2902 is an observed value in the running batch program 600. The stream execution monitoring value 2902 is described later.

The second dynamic determination module 2903 receives the program configuration 801 illustrated in FIG. 9, and the platform requirement 802 and the stream execution monitoring value 2902 illustrated in FIG. 10 from the client 301. Then, the second dynamic determination module 2903 determines a dynamic input data size, overlapping width, and necessity of the calculation state of the stream program 400. The determined input data size 1401 and overlapping width 1402 are output as stream program input/output setting 2703. The input data size and the overlapping width are described later.

<Stream Execution Monitoring Value 2902>

FIG. 30 is an explanatory diagram for illustrating an example of the stream execution monitoring value 2902. The stream execution monitoring value 2902 includes, as parameters, the number of pieces of data to be processed 3001, a processing throughput 3002, and a calculation state holding/reading period 3003, and is output by the stream execution monitoring module 2901. The number of pieces of data to be processed 3001 is the number of elements of vector data VD input to the stream program 400. The number of elements is stored, for example, in a file.

In FIG. 30, the number of pieces of data to be processed 3001 is 240, which represents that the number of elements of the vector data VD is 240 in the file. Moreover, the processing throughput 3002 represents the number of pieces of the stream data processed by the stream program 400 per unit time. The calculation state holding/reading period 3003 represents a period required for holding and reading the calculation state.

<Stream Program Input/Output Setting 2703>

FIG. 31 is an explanatory diagram for illustrating an example of the stream program input/output setting 2703 illustrated in FIG. 27 and FIG. 29. The stream program input/output setting 2703 is information defining data to be input and output to and from the stream program 400. Examples of the parameters include an input data size 3101, an overlapping width 3102, and a calculation state holding necessity 3103, and the parameters are specified by the user operating the client 301. The input data size 3101 is the size of the stream data input to the stream program 400.

For example, the input data size 3101 illustrated in FIG. 31 is 240, and hence the stream program 400 inputs 240 pieces of stream data. Moreover, the overlapping width 3102 represents the number of overlapping pieces of stream data between the stream data input to the stream program 400 and the stream data input to the stream program 400 in the previous execution. In FIG. 31, the overlapping width 3102 is 3, which represents that three pieces of stream data overlap the stream data input to the stream program 400 in the previous execution. Moreover, the calculation state holding necessity 3103 represents whether or not the calculation state of the stream program 400 is held. In FIG. 31, the calculation state holding necessity 3103 is set to "unnecessary", and hence the calculation state is not held.

<Stream Program Execution Module 2635>

Figure 32:
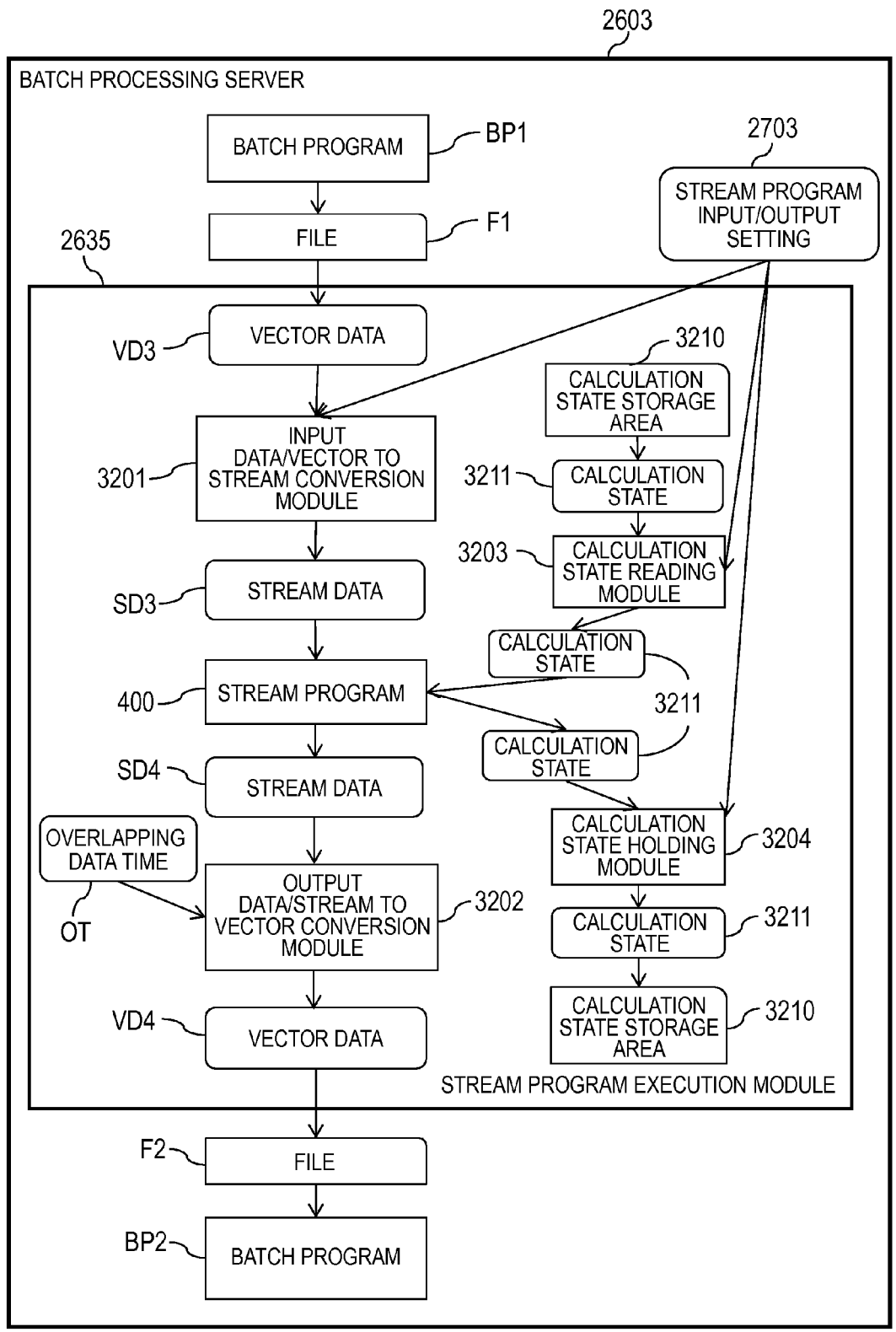
FIG. 32 is an explanatory diagram for illustrating an input/output relationship of the stream program execution module illustrated in FIG. 26.

FIG. 32 is an explanatory diagram for illustrating an input/output relationship of the stream program execution module 2635 illustrated in FIG. 26. The stream program execution module 2635 includes an input data/vector to stream conversion module 3201, an output data/stream to vector conversion module 3202, a calculation state reading module 3203, and a calculation state holding module 3204.

The input data/vector to stream conversion module 3201, the calculation state reading module 3203, and the calculation state holding module 3204 input the stream program input/output setting 2703. The stream program input/output setting 2703 may be generated by the second static determination module 2702 or the second dynamic determination module 2903, or may be manually created by the user.

When the stream program 400 starts the execution, the calculation state reading module 3203 reads a calculation state 3211 stored in the calculation state storage area 3210, and inputs the calculation state 3211 to the stream program 400 in accordance with the stream program input/output setting 2703. When the execution of the stream program 400 is finished, the calculation state holding module 3204 inputs the calculation state 3211 to the stream program 400 in accordance with the stream program input/output setting 2703.

The input data/vector to stream conversion module 3201 inputs vector data VD3 in a file F1, which is an output of the batch program BP1, and converts the vector data VD3 into stream data in accordance with the stream program input/output setting 2703. The vector data VD3 input by the input data/vector to stream conversion module 3201 may be stored in a file, a database, or another storage area. Moreover, the batch program 600 may store the vector data VD3 in the file F1 or another storage area, or another program may store the vector data VD3.

The stream program 400 inputs the stream data output by the input data/vector to stream conversion module 3201, and outputs stream data as a processing result thereof. Then, the output data/stream to vector conversion module 3202 inputs stream data SD4 output by the stream program 400, and converts the stream data SD4 into vector data VD4. The vector data VD4 output by the output data/stream to vector conversion module 3202 is stored in a file F2, a database, or another storage area. The vector data VD4 stored in the file F2 or another storage area may be input to the batch program 600 or another program.

<Overlapping Data Time>

Figure 33:
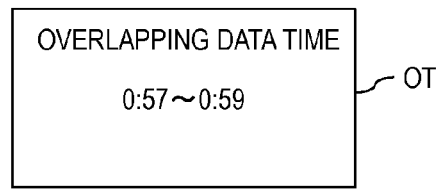
FIG. 33 is an explanatory diagram for illustrating an example of the overlapping data time illustrated in FIG. 32.

FIG. 33 is an explanatory diagram for illustrating an example of the overlapping data time illustrated in FIG. 32. The overlapping data time OT represents the time of stream data, which is out of the stream data input to the stream program 400 and overlaps the stream data input to the stream program 400 in the previous execution. In FIG. 33, the overlapping data time OT is "0:57 to 0:59", and pieces of stream data at the times "0:57" to "0:59" are thus used as the input both in the current execution and the previous execution of the stream program 400. The overlapping data time OT is set by the input data/vector to stream conversion module 3201, and is used by the output data/stream to vector conversion module 3202.

<Operator Tree>

Figure 34:
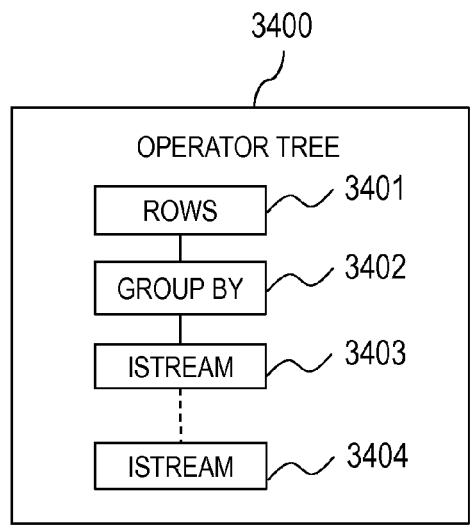
FIG. 34 is an explanatory diagram for illustrating an example of an operator tree.

FIG. 34 is an explanatory diagram for illustrating an example of an operator tree. An operator tree 3400 is generated by compiling the stream program 400 described in the CQL. The stream processing platform 321 carries out respective operators 3401 to 3404 constructing the operator tree 3400 in a sequence specified by the operator tree 3400. The operator tree 3400 illustrated in FIG. 34 is an operator tree 3400 generated as a result of compiling the noise removal query 403 and the abnormal sensor query 404 illustrated in FIG. 4. For example, the operator tree 3400 is constructed by ROWS 3401, GROUP BY 3402, ISTREAM 3403, and ISTREAM 3404, and is carried out in a sequence of ROWS 3401, GROUP BY 3402, ISTREAM 3403, and ISTREAM 3404.

<Calculation State Storage Area 3210>

Figure 35:
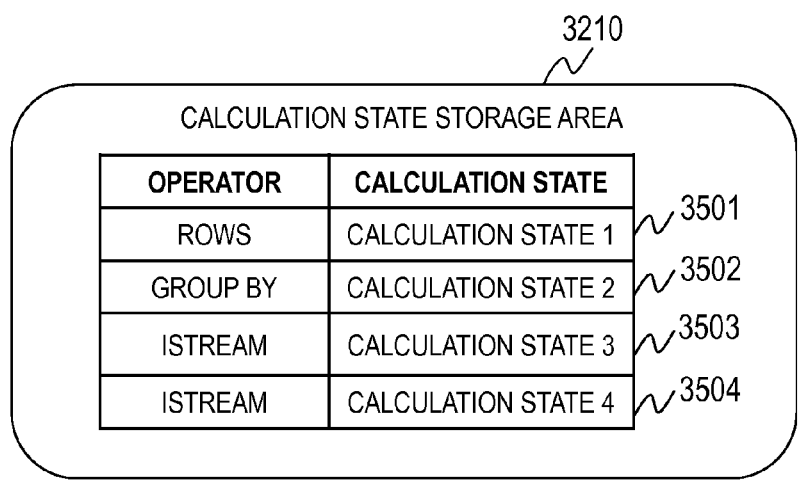
FIG. 35 is an explanatory diagram for illustrating an example of the calculation state storage area illustrated in FIG. 32.

FIG. 35 is an explanatory diagram for illustrating an example of the calculation state storage area 3210 illustrated in FIG. 32. In the calculation state storage area 3210, the calculation state 3211 is stored. The calculation state 3211 represents states used for calculations for the respective operators 3401 to 3404. For example, the calculation state for the ROWS 3401 is a window for holding the latest four pieces of stream data, and thus stores four pieces of stream data. Moreover, the calculation state 3211 for the operator GROUP BY 3402 stores an average of the latest four measured values.

<Processing Procedure by Second Static Determination Module 2702>

Figure 36:
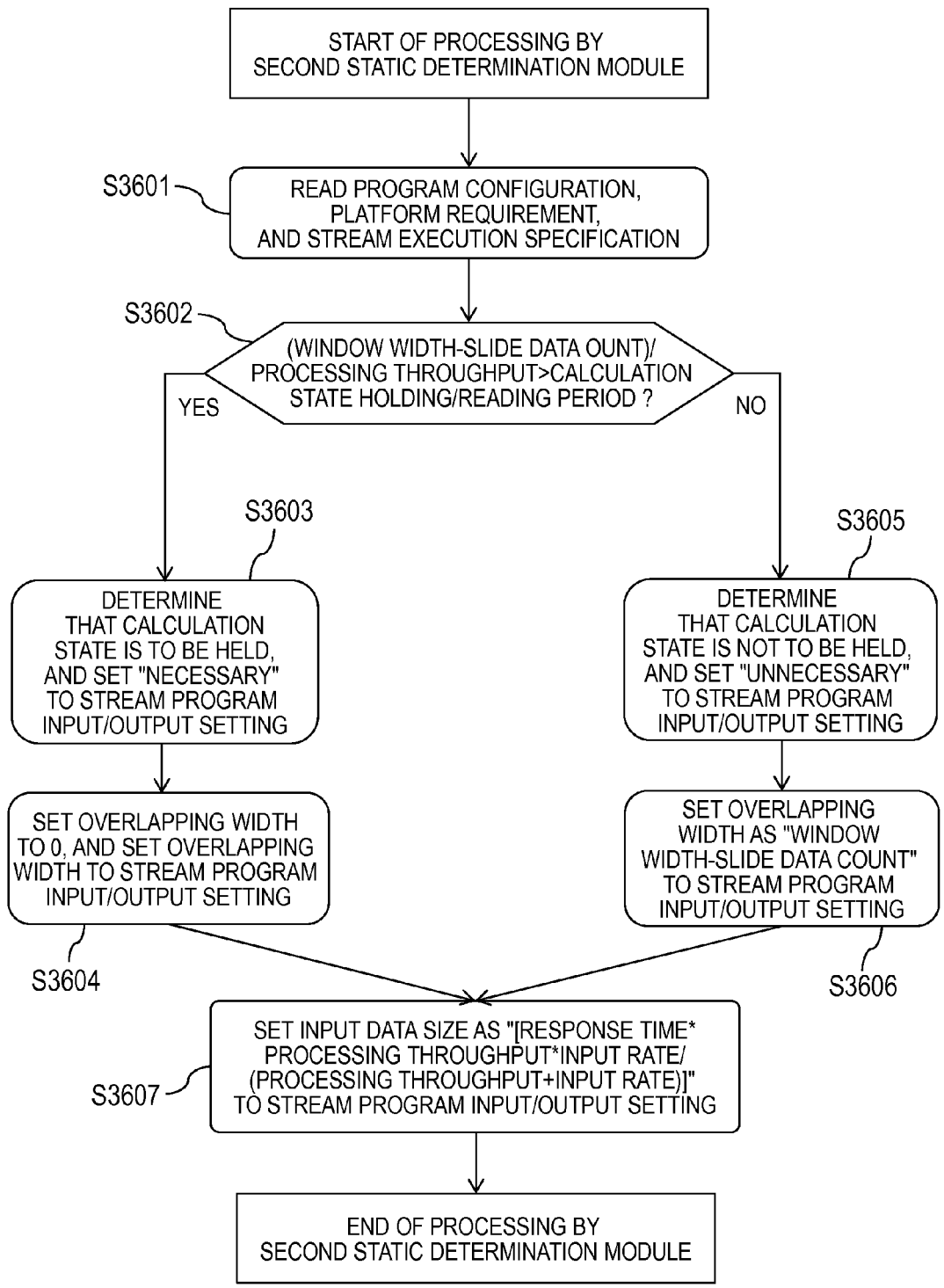
FIG. 36 is a flowchart for illustrating a processing procedure example by the second static determination module.

FIG. 36 is a flowchart for illustrating a processing procedure example by the second static determination module 2702. The second static determination module 2702 first reads the program configuration 801, the platform requirement 802, and a stream execution specification 2701 (Step S3601).

Then, the second static determination module 2702 determines whether or not "(window width-slide data count)/processing throughput" is more than the calculation state holding/reading period 2803 (Step S3602). When "(window width-slide data count)/processing throughput" is more than the calculation state holding/reading period 2803 (Yes in Step S3602), the second static determination module 2702 sets the calculation state holding necessity 3103 to "necessary" in the stream program input/output setting 2703 (Step S3603), and sets the overlapping width 3102 to 0 in the stream program input/output setting 2703 (Step S3604). Then, the processing procedure transitions to Step S3607.

On the other hand, when "(window width-slide data count)/processing throughput" is equal to or less than the calculation state holding/reading period 2803 (No in Step S3602), the second static determination module 2702 sets the calculation state holding necessity 3103 to "unnecessary" in the stream program input/output setting (Step S3605), and sets the overlapping width 3102 to "window width-slide data count" in the stream program input/output setting 2703 (Step S3606). Then, the processing procedure transitions to Step S3607.

On this occasion, in the vector data VD to be processed, a period until the execution of the stream program 400 is referred to as "waiting period", and an execution period of the stream program 400 is referred to as "execution period". When the waiting period+the execution period is equal to or less than the response time 1001, the processing can be carried out in the required response time 1001. The waiting period is "size of the vector data VD to be processed (hereinafter referred to as "vector size")/input rate", and the execution period is "vector size/processing throughput".

Therefore, "vector size/input rate+vector size/processing throughput" needs to be equal to or less than the response time 1001. Thus, a processable data size of the vector data VD (hereinafter referred to as "number of processable data") is the maximum vector size satisfying "vector size/input rate+vector size/processing throughput response time". As a result, the vector size is [response time×processing throughput×input rate/(processing throughput+input rate)] ([ ] is the Gauss symbol).

Thus, the second static determination module 2702 sets the input data size 3101 as [response time×processing throuhput×input rate/(processing throughput+input rate)] to the stream program input/output setting 2703 (Step S3607). As a result, the processing by the second static determination module 2702 is finished.

<Processing Procedure by Stream Execution Monitoring Module 2901>

Figure 37:
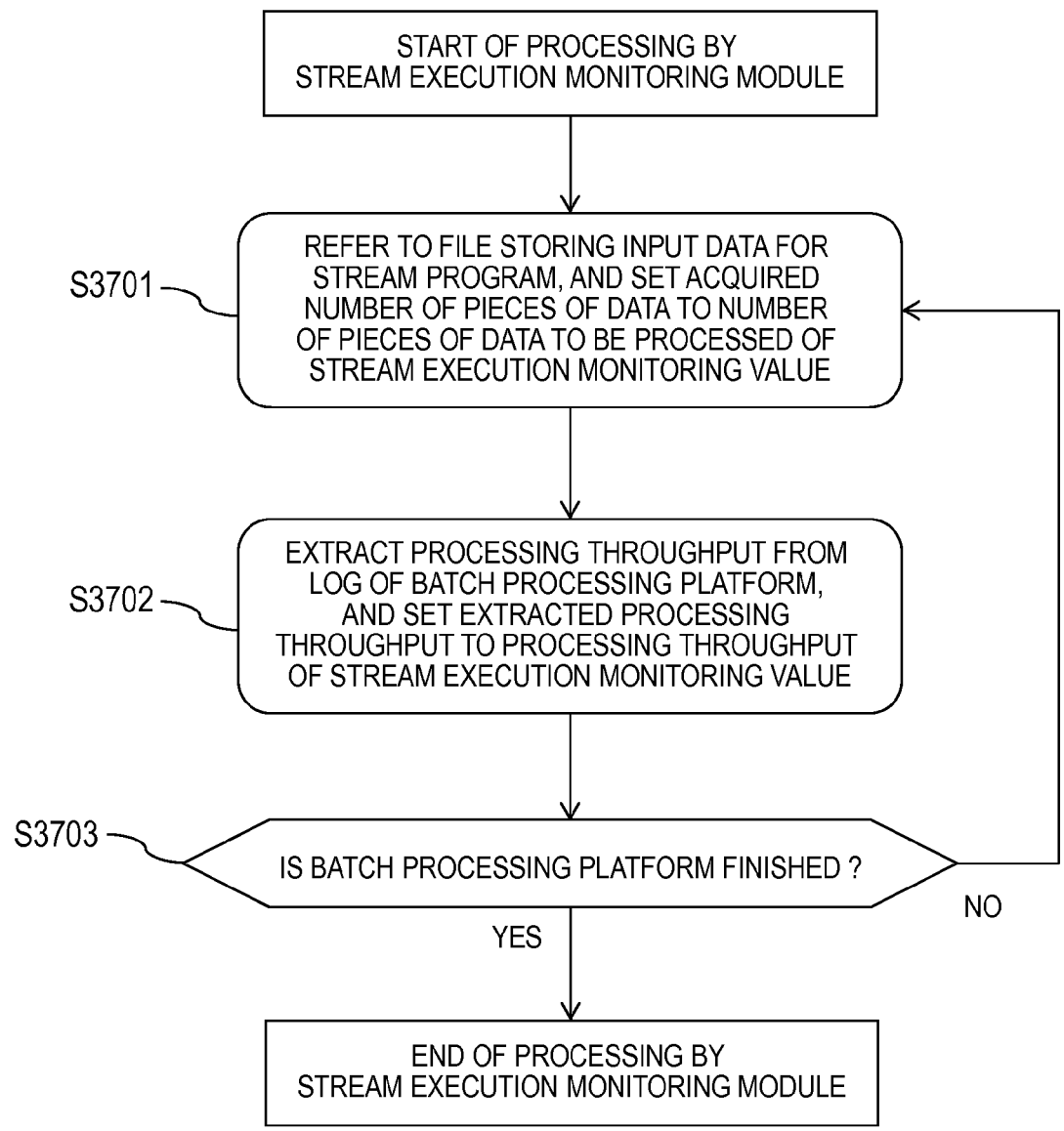
FIG. 37 is a flowchart for illustrating a processing procedure example by the stream execution monitoring module.

FIG. 37 is a flowchart for illustrating a processing procedure example by the stream execution monitoring module 2901. The stream execution monitoring module 2901 refers to a file storing stream data to be input to the stream program 400, and sets the stream execution monitoring value 2902 to the number of pieces of data to be processed 3001 (Step S3701).

Then, the stream execution monitoring module 2901 extracts the processing throughput from a log of the batch processing platform 2621, and sets the extracted processing throughput to the processing throughput 3002 of the stream execution monitoring value 2902 (Step S3702). Then, when the batch processing platform 2621 is not finished (No in Step S3703), the batch execution monitoring module 1201 returns to Step S3701, and when the batch processing platform 2621 is finished (Yes in Step S3703), finishes the processing.

<Processing Procedure by Second Dynamic Determination Module 2903>

Figure 38:
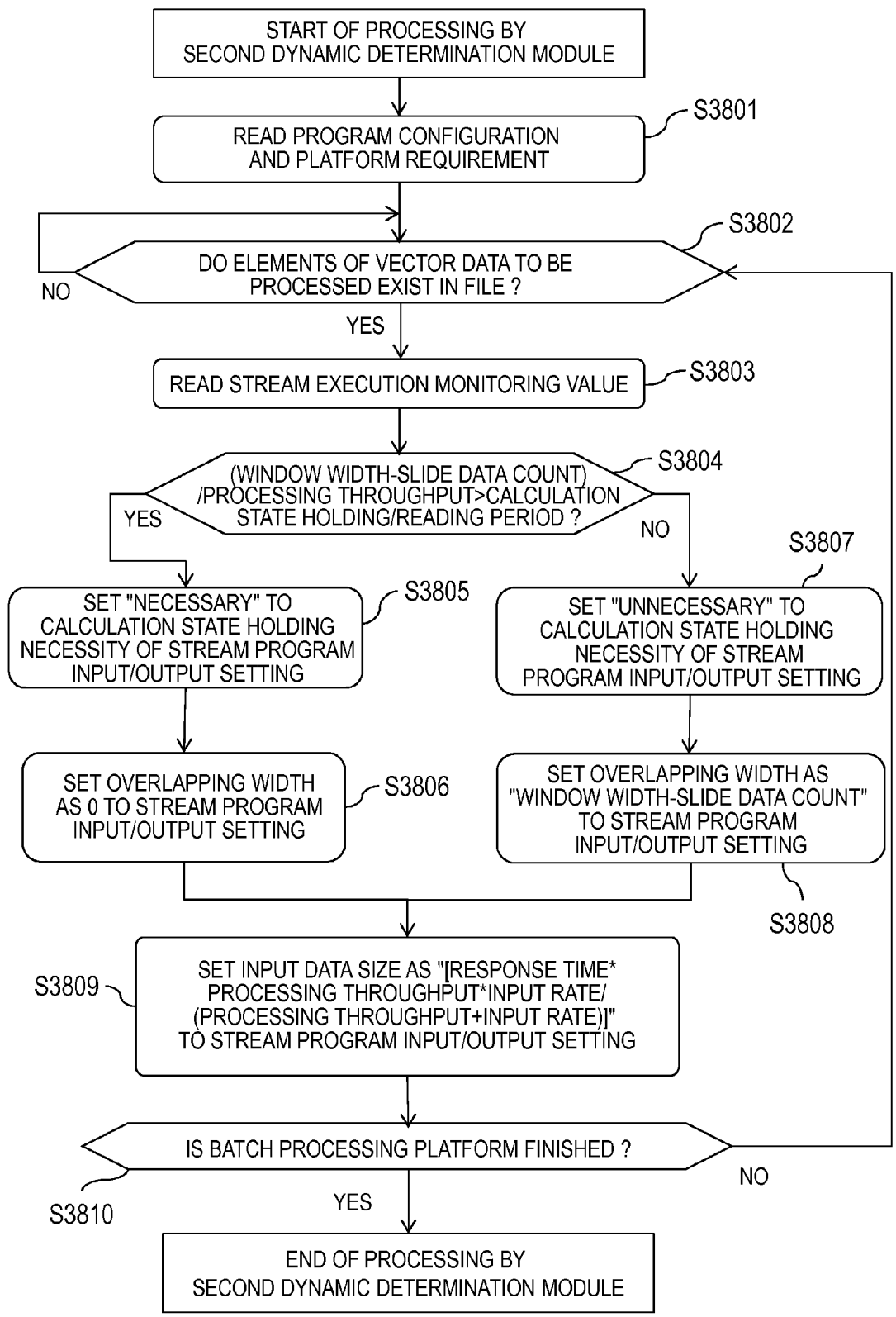
FIG. 38 is a flowchart for illustrating a processing procedure example by the second dynamic determination module.

FIG. 38 is a flowchart for illustrating a processing procedure example by the second dynamic determination module 2903. The second dynamic determination module 2903 first reads the program configuration 801 and the platform requirement 802 (Step S3801). Then, the second dynamic determination module 2903 determines whether or not the elements of the vector data VD to be processed exist in the file (Step S3802). When the vector data VD to be processed exists in the file (Yes in Step S3802), the second dynamic determination module 2903 reads the stream execution monitoring value 2902 (Step S3803).

Then, the second dynamic determination module 2903 determines whether or not "(window width-slide data count)/processing throughput" is more than the calculation state holding/reading period 3003 (Step S3804). When "(window width-slide data count)/processing throughput" is more than the calculation state holding/reading period 3003 (Yes in Step S3804), the second dynamic determination module 2903 sets the calculation state holding necessity 3103 to "necessary" in the stream program input/output setting 2703 (Step S3805), and sets the overlapping width 3102 to 0 in the stream program input/output setting 2703 (Step S3806). Then, the processing procedure transitions to Step S3809.

On the other hand, when "(window width-slide data count)/processing throughput" is equal to or less than the calculation state holding/reading period 3003 (No in Step S3804), the second dynamic determination module 2903 sets the calculation state holding necessity 3103 to "unnecessary" in the stream program input/output setting 2703 (Step S3807), and sets the overlapping width 3102 to "window width-slide data count" in the stream program input/output setting 2703 (Step S3808). Then, the processing procedure transitions to Step S3809.

On this occasion, in the vector data VD to be processed, a period until the execution of the stream program 400 is referred to as "waiting period", and an execution period of the stream program 400 is referred to as "execution period". When the waiting period+the execution period is equal to or less than the response time 1001, the processing can be carried out in the required response time 1001. The waiting period is "size of the vector data VD to be processed (hereinafter referred to as "vector size")/input rate", and the execution period is "vector size/processing throughput".

Therefore, "vector size/input rate+vector size/processing throughput" needs to be equal to or less than the response time 1001. Thus, a processable data size of the vector data VD (hereinafter referred to as "number of processable data") is the maximum vector size satisfying "vector size/input rate+vector size/processing throughput response time". As a result, the vector size is [response time×processing throughput×input rate/(processing throughput+input rate)] ([ ] is the Gauss symbol).

Thus, the second dynamic determination module 2903 sets the input data size 3101 as [response time×processing throuhput×input rate/(processing throughput+input rate)] to the stream program input/output setting 2703 (Step S3809).

Then, the second dynamic determination module 2903 determines whether or not the batch processing platform 2621 is finished (Step S3810), and when the batch processing platform 2621 is not finished (No in Step S3810), returns to Step S3802. On the other hand, when the batch processing platform 2621 is finished (Yes in Step S3810), the processing by the second dynamic determination module 2903 is finished.

<Processing Procedure by Input Data/Vector to Stream Conversion Module 3201>

Figure 39:
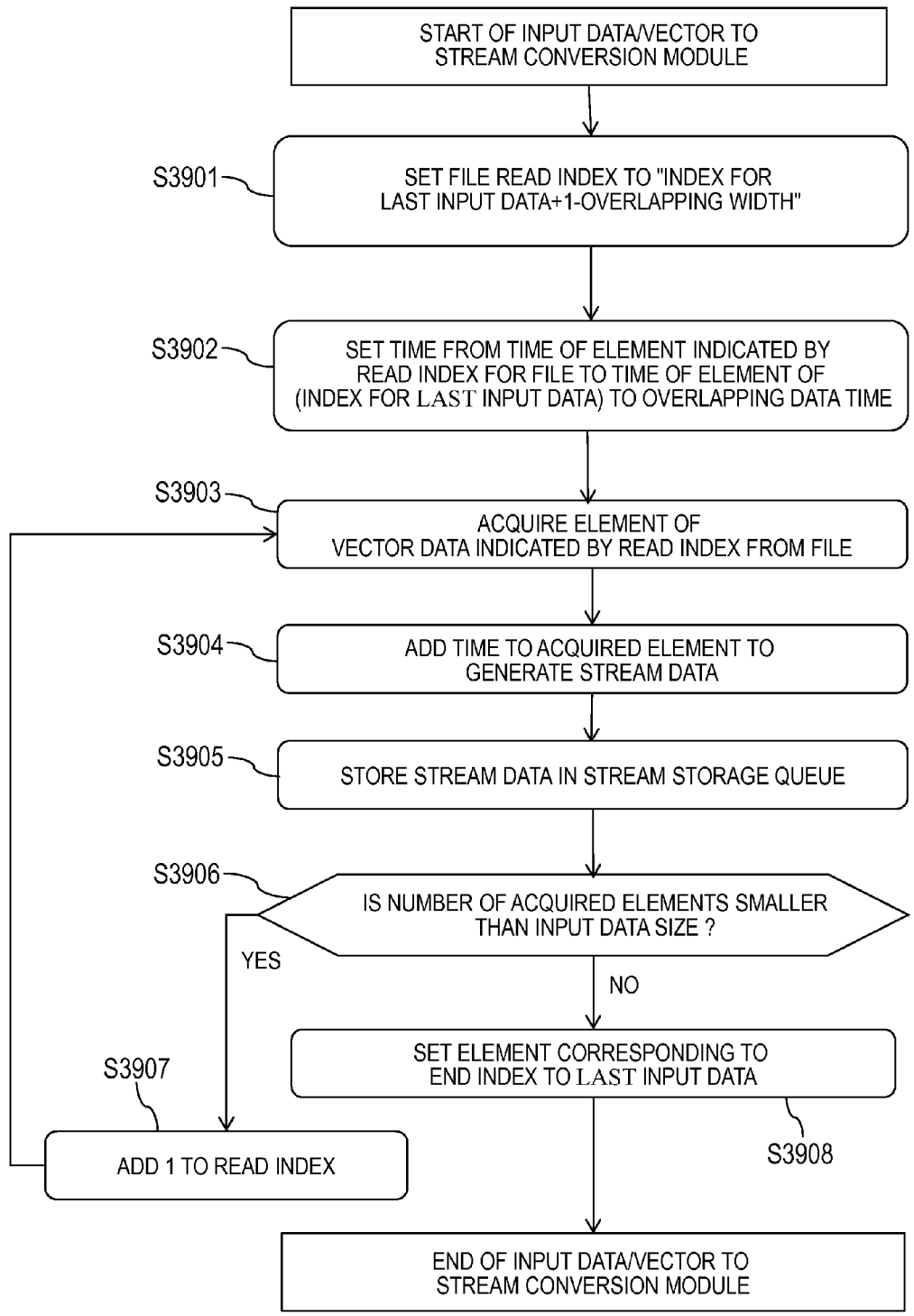
FIG. 39 is a flowchart for illustrating a processing procedure example by the input data/vector to stream conversion module illustrated in FIG. 32.

FIG. 39 is a flowchart for illustrating a processing procedure example by the input data/vector to stream conversion module 3201 illustrated in FIG. 32. The input data/vector to stream conversion module 3201 first sets the file read index to "index for last input data +1—overlapping width" (Step S3901). The last input data is an element of the vector data VD read last from the file.

Then, the input/data/vector to stream conversion module 3201 sets the time from a time for an element indicated by the read index for the file to a time for an element corresponding to an index acquired by subtracting 1 from an index for the last input data, to the overlapping data time OT (Step S3902).

Then, the input data/vector to stream conversion module 3201 acquires the element of the vector data VD indicated by the read index from the file (Step S3903), and adds the time to the acquired element to generate stream data (Step S3904). Then, the input data/vector to stream conversion module 3201 stores the stream data in the stream storage queue Q (Step S3905).

Then, the input data/vector to stream conversion module 3201 determines whether or not the number of the acquired elements is smaller than the input data size (Step S3906). When the number of the acquired elements is smaller than the input data size (Yes in Step S3906), the input data/vector to stream conversion module 3201 adds 1 to the read index (Step S3907), returns to Step S3903, and carries out Step S3903 to Step S3905.

Then, when the number of pieces of acquired data is equal to or larger than the input data size (No in Step S3906), the input data/vector to stream conversion module 3201 sets an element indicated by an end index in the file to the last input data (Step S3908), and finishes the processing.

<Conversion Example from Vector Data VD into Stream Data>

Figure 40:
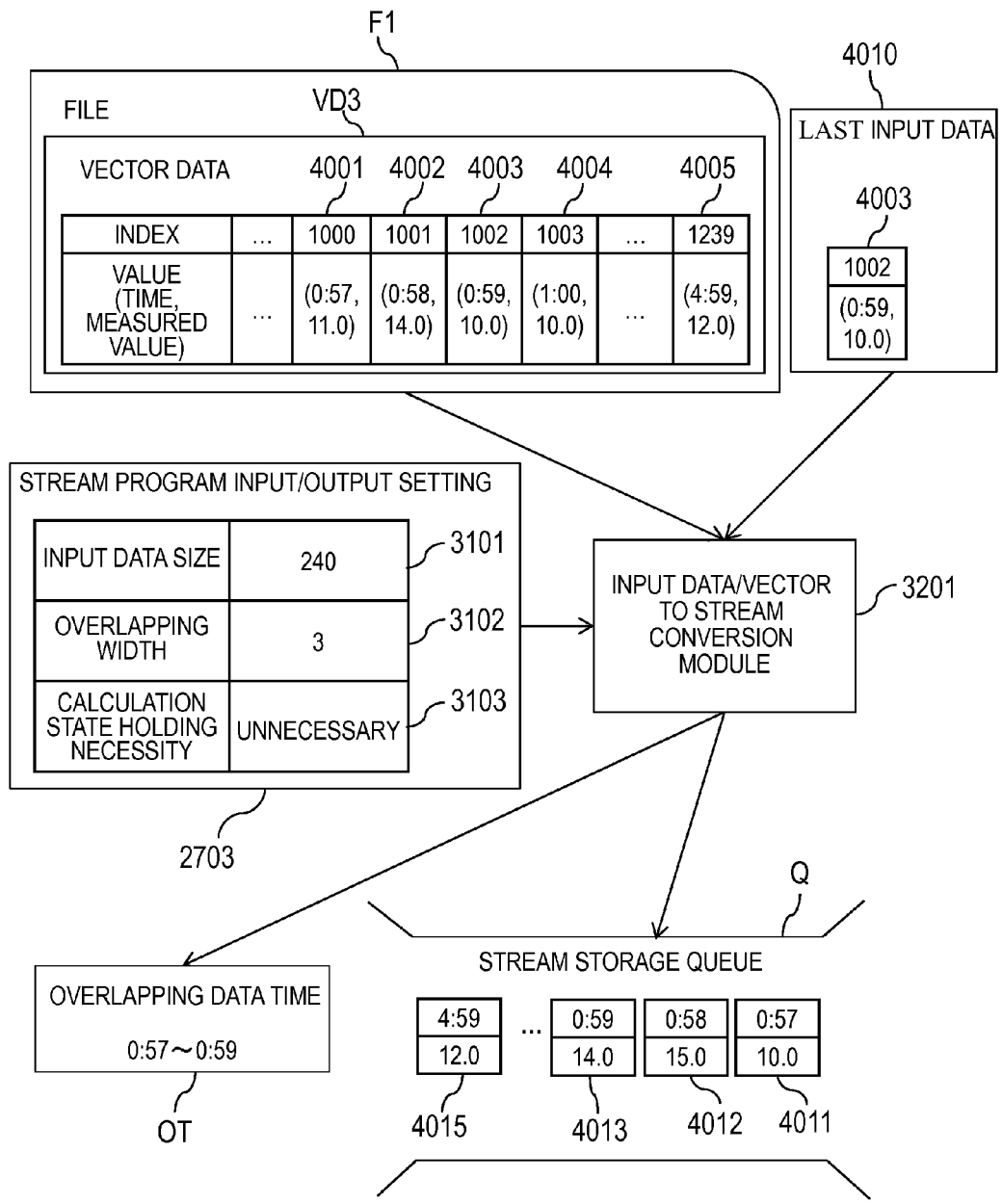
FIG. 40 is an explanatory diagram for illustrating a conversion example from vector data into stream data.

FIG. 40 is an explanatory diagram for illustrating a conversion example from vector data VD into stream data. A description is given of FIG. 40 referring to the step numbers in FIG. 39. It should be noted that the last input data at this time is an element (10.0) indicated by the index 1002.

In Step S3901, the input data/vector to stream conversion module 3201 sets the file read index to "index 1002 for last input data +1—overlapping width 3=1000".

Moreover, in Step S3902, the input data/vector to stream conversion module 3201 sets the time from a time 0:57 for the element indicated by a read index 1000 for the file to a time 0:59 for the element indicated by an index 1002 of the last input data, to the overlapping data time.

Moreover, in Step S3903, the input data/vector to stream conversion module 3201 acquires the element (10.0) indicated by the read index 1002 from the file, and, in Step S3904, generates stream data to which the time 0:59 for the element is added, and stores the stream data in the stream storage queue Q.

Then, in Step S3906, the input data/vector to stream conversion module 3201 determines whether or not the number of acquired elements (on this stage, one element indicated by the index 1000) is smaller than the input data size 240. In this case, the number of acquired elements is smaller than the input data size 240, and hence the input data/vector to stream conversion module 3201 changes the read index from 1000 to 1001. Through repetition of this loop, data indicated by indices 1001 to 1239 indicating the elements of the vector data VD can be sequentially acquired, and the pieces of stream data 4011 to 4015 at the time 0:57 to the time 4:59 can be stored in the stream storage queue Q 501.

<Processing Procedure by Output Data/Stream to Vector Conversion Module 3202>

Figure 41:
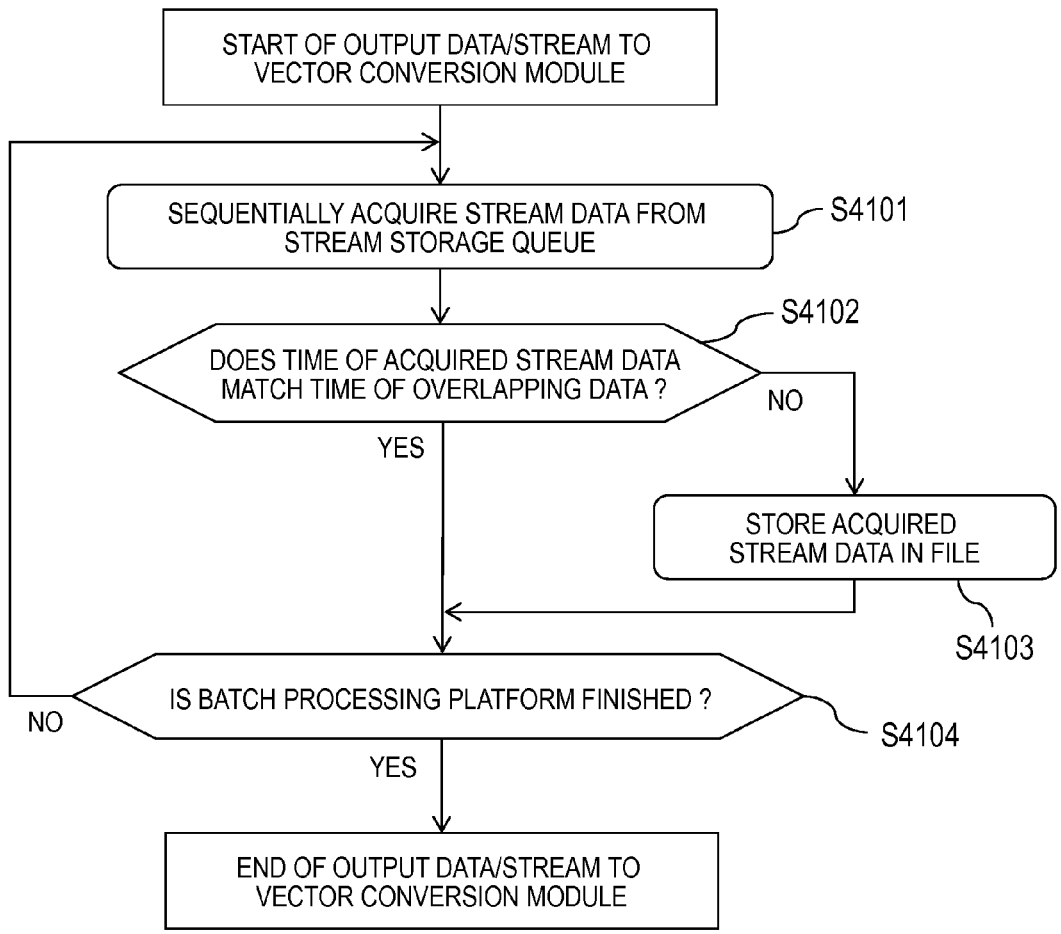
FIG. 41 is a flowchart for illustrating a processing procedure example by the output data/stream to vector conversion module illustrated in FIG. 32.

FIG. 41 is a flowchart for illustrating a processing procedure example by the output data/stream to vector conversion module 3202 illustrated in FIG. 32. The output data/stream to vector conversion module 3202 sequentially acquires stream data from the stream storage queue Q (S4101). Then, the output data/stream to vector conversion module 3202 determines whether or not the time of the acquired stream data matches the overlapping data time OT (Step S4102).

When the time of the stream data matches the overlapping data time OT (Yes in Step S4102), the processing procedure transitions to Step S4104. When the time of the stream data does not match the overlapping data time OT (No in Step S4102), the output data/stream to vector conversion module 3202 stores the acquired stream data in the file (Step S4103), and the processing procedure transitions to Step S4104.

In Step S4104, the output data/stream to vector conversion module 3202 determines whether or not the batch processing platform 2621 is finished (Step S4104), and when the batch processing platform 2621 is not finished (No in Step S4104), returns to Step S4101. On the other hand, when the batch processing platform 2621 is finished (Yes in Step S4104), the processing by the output data/stream to vector conversion module 3202 is finished.

<Conversion Example from Stream Data into Vector Data VD>

Figure 42:
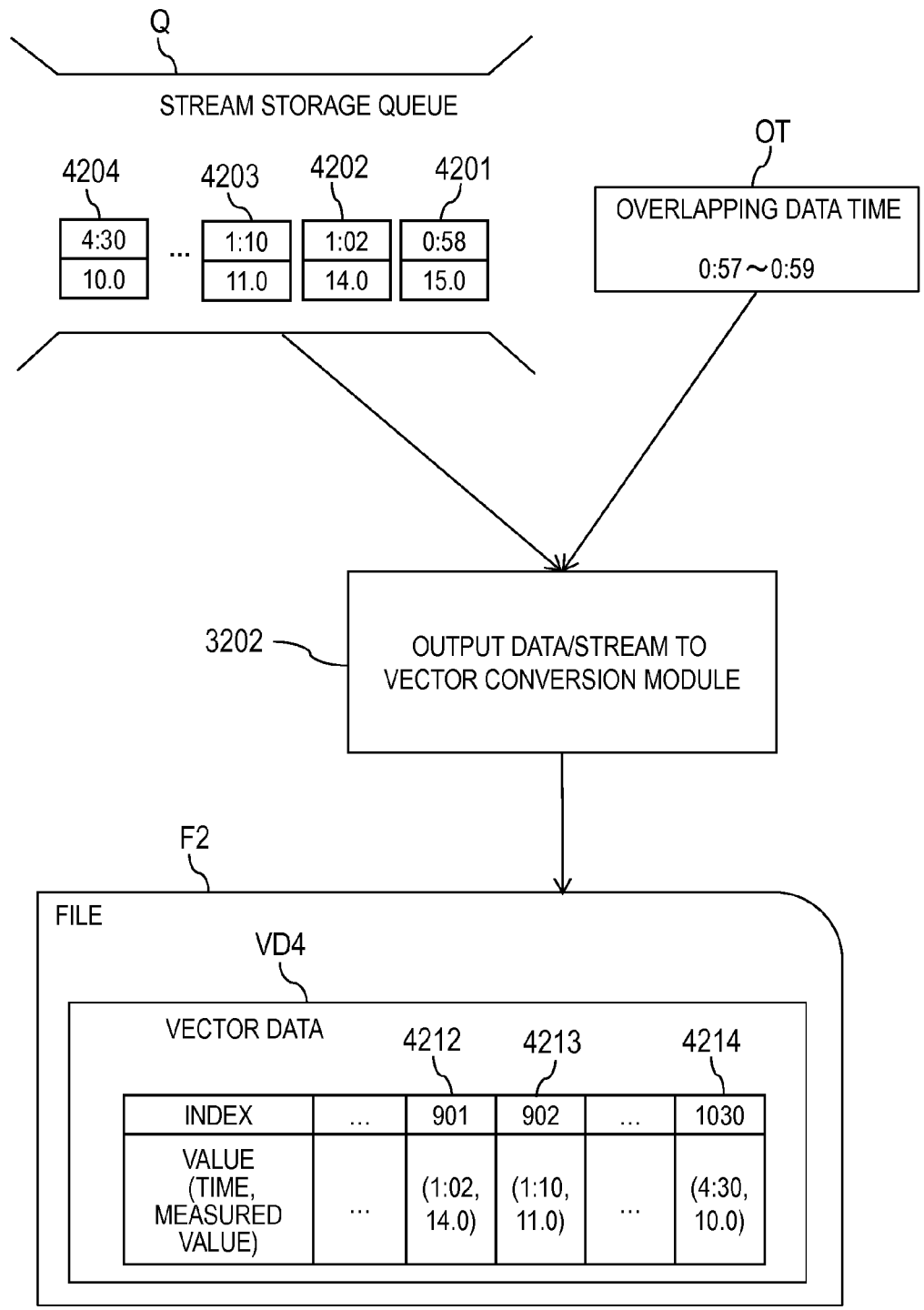
FIG. 42 is an explanatory diagram for illustrating a conversion example from stream data into vector data.

FIG. 42 is an explanatory diagram for illustrating a conversion example from stream data into vector data VD. A description is given of FIG. 42 referring to the step numbers in FIG. 41. In Step S4101, the output data/stream to vector conversion module 3202 sequentially acquires pieces of stream data 4201 to 4204 from the stream storage queue Q.

In Step S4102, the output data/stream to vector conversion module 3202 determines whether or not the time of each piece of the acquired stream data matches the overlapping data time OT. In this case, the stream data 4201 at the time 0:58 matches, and the stream data 4202 after the time 1:02 does not match. Therefore, in Step S4103, the output data/stream to vector conversion module 3202 stores the pieces of stream data 4202 to 4204 after the time 1:02 that do not match the overlapping data time OT in the file F2. As a result, the pieces of stream data overlapping the time of the previous stream data do not undergo the vector conversion, and are thus not output. As a result, the batch program 600 on the subsequent stage can refer to the file to carry out the batch processing.

<Processing Procedure by Calculation State Reading Module 3203>

Figure 43:
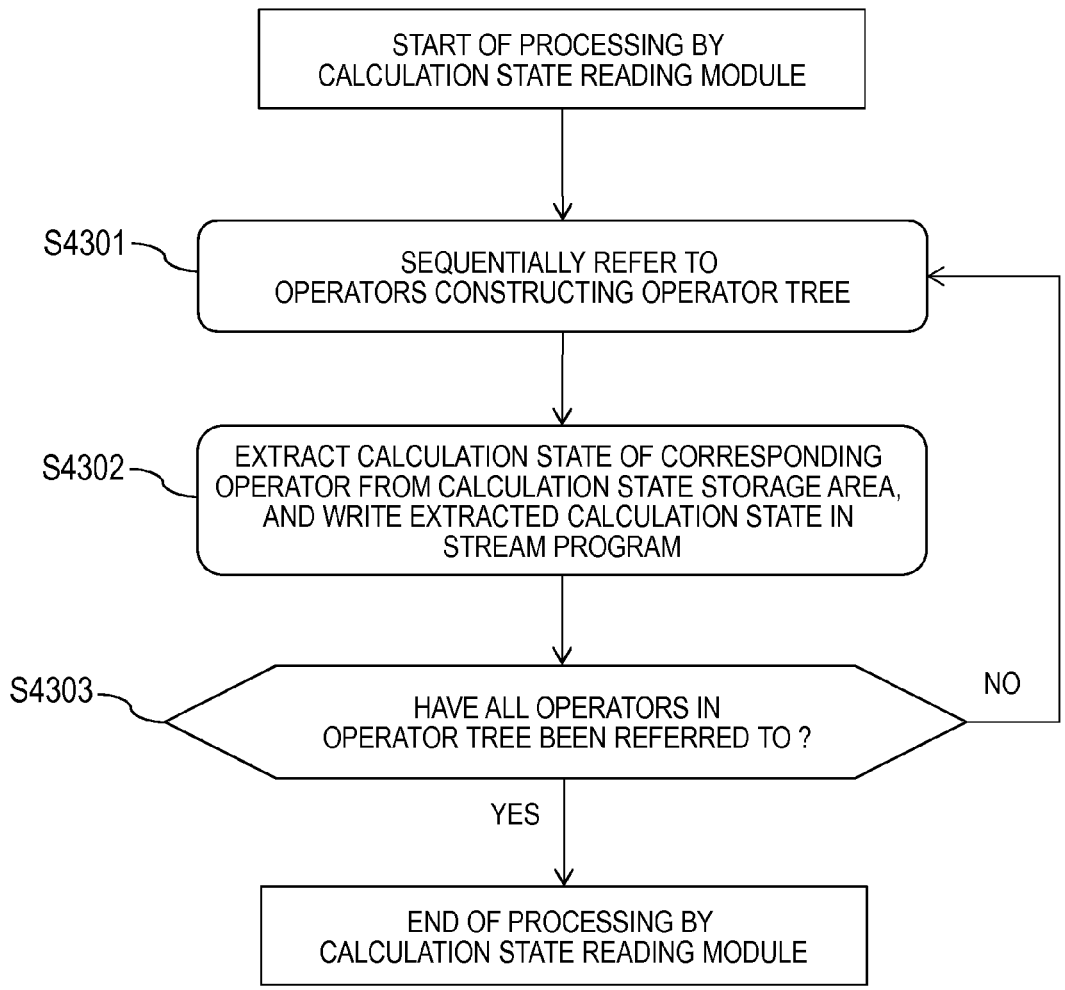
FIG. 43 is a flowchart for illustrating a processing procedure by the calculation state reading module illustrated in FIG. 32.

FIG. 43 is a flowchart for illustrating a processing procedure by the calculation state reading module 3203 illustrated in FIG. 32. First, the calculation state reading module 3203 sequentially refers to the operators constructing the operator tree 3400 (Step S4301), extracts the calculation state 3211 of the referred operator from the calculation state storage area 3210, and writes the calculation state 3211 in the stream program 400 (Step S4302). Then, the calculation state reading module 3203 determines whether or not all the operators in the operator tree 3400 have been referred to (Step S4303). When all the operators have not been referred to (No in Step S4303), the processing procedure returns to Step S4301. On the other hand, when all the operators have been referred to (Yes in Step S4303), the processing by the calculation state reading module 3203 is finished.

<Processing Procedure by Calculation State Holding Module 3204>

Figure 44:
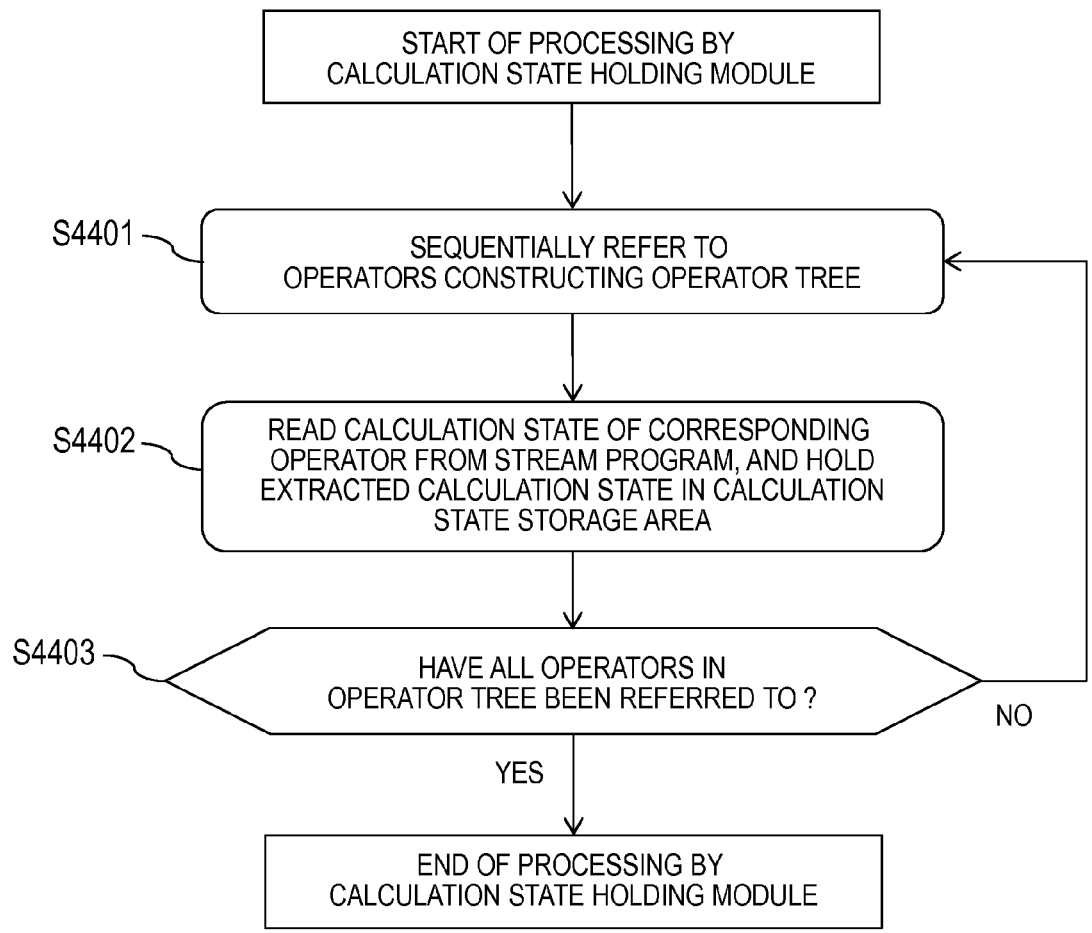
FIG. 44 is a flowchart for illustrating a processing procedure by the calculation state holding module illustrated in FIG. 32.

FIG. 44 is a flowchart for illustrating a processing procedure by the calculation state holding module 3204 illustrated in FIG. 32. First, the calculation state holding module 3204 sequentially refers to the operators constructing the operator tree 3400 (Step S4401), extracts the calculation state 3211 of the referred operator from the stream program 400, and holds the calculation state 3211 in the calculation state storage area 3210 (Step S4402). Then, the calculation state holding module 3204 determines whether or not all the operators in the operator tree 3400 have been referred to (Step S4403). When all the operators have not been referred to (No in Step S4403), the processing procedure returns to Step S4401. On the other hand, when all the operators have been referred to (Yes in Step S4403), the processing by the calculation state holding module 3204 is finished.

In this manner, according to the second embodiment, pieces of stream data substantially overlap by using the execution result of the stream processing at the previous batch processing. This avoids the state of the calculation execution inability and maintains the semantics of the stream program.

As described above, according to the embodiments of this invention, a batch program that requires an overlap between pieces of input data can be executed on the stream processing platform. Moreover, the processing throughput can be increased by increasing the input data size for the batch program and carrying out the processing for the data in the collected manner. Moreover, a stream program that requires an overlap between pieces of input data can be executed on the batch processing platform.

In other words, a program for one of batch processing and stream processing is executed on a processing platform for the other in a manner that an overlap is provided between pieces of time series data, to thereby execute the other processing. As a result, without changing a code or an algorithm of the program for one of the batch processing and the stream processing executed on the processing platform for the other, the program for the one processing can be executed on the processing platform for the other. Thus, an existing program can be used on a processing platform different in the type of processing, and can be executed easily and efficiently.

This invention has been described in detail so far with reference to the accompanying drawings, but this invention is not limited to those specific configurations described above, and includes various changes and equivalent components within the gist of the scope of claims appended.

What is claimed is:

1. A data processing apparatus, comprising:
   a processor; and
   a memory for storing a stream program for carrying out stream processing, a batch program for carrying out batch processing, and a stream processing control program for controlling the stream program,
   the processor being configured to carry out:
   a first generation procedure of generating, by the stream processing control program, for a time-series first stream data group of stream data out of a time-series stream data sequence, first vector data including elements acquired by collecting respective pieces of stream data of the time-series first stream data group;
   a second generation procedure of generating, by the stream processing control program, for a time-series second stream data group including, as a head, a piece of intermediate stream data of the time-series first stream data group in the time-series stream data sequence and having the same number of pieces of data as the time-series first stream data group, second vector data including elements acquired by collecting respective pieces of stream data of the time-series second stream data group; and
   a control procedure of inputting, by the stream processing control program, the first vector data and the second vector data generated respectively by the first generation procedure and the second generation procedure to the batch program to control the batch program to carry out the batch processing,
   wherein the processor is further configured to carry out a setting procedure of setting, by the stream processing control program, a number of elements to be included in the first vector data and the second vector data, which is the same as a number of pieces of data existing in the time-series first stream data group and the time-series second stream data group, as an input data size, and setting an overlapping number of the elements between the first vector data and the second vector data, which is the same as an overlapping number of pieces of stream data between the time-series first stream data group and the time-series second stream data group, as an overlapping width.

2. The data processing apparatus according to claim 1, wherein the processor is further configured to carry out:
   a first conversion procedure of converting, by the stream processing control program, for third vector data, which is an execution result of inputting the first vector data to the batch program and carrying out the batch processing by the control procedure, an element group of values at respective times included in the third vector data into a time-series third stream data group of values corresponding to the times; and
   a second conversion procedure of converting, by the stream processing control program, for fourth vector data, which is an execution result of inputting the second vector data to the batch program and carrying out the batch processing by the control procedure, an element group of values at respective times included in the fourth vector data into a time-series fourth stream data group of values corresponding to the times.

3. The data processing apparatus according to claim 1, wherein the processor is further configured to carry out an output procedure of outputting, by the stream processing control program, the time-series first stream data group and the time-series second stream data group, which are processing results of the stream processing carried out by controlling the stream program,
   wherein, in the first generation procedure, the processor is configured to generate, by the stream processing control program, the first vector data for the time-series first stream data group output by the output procedure, and
   wherein, in the second generation procedure, the processor is configured to generate, by the stream processing control program, the second vector data for the time-series second stream data group output by the output procedure.

4. The data processing apparatus according to claim 1,
   wherein, in the first generation procedure, the processor is configured to generate, by the stream processing control program, based on the input data size and the overlapping width set by the setting procedure, the first vector data for the time-series first stream data group output by the output procedure, and
   wherein, in the second generation procedure, the processor is configured to generate, by the stream processing control program, based on the input data size and the overlapping width set by the setting procedure, the second vector data for the time-series second stream data group output by the output procedure.

5. The data processing apparatus according to claim 4, wherein, in the setting procedure, the processor is configured to set, by the stream processing control program, the input data size based on a response time, which is a time from an input of each piece of stream data of the time-series stream data sequence to a completion of the batch processing in the batch program, an input rate, which is an interval of the input of the each piece of stream data to the batch program, and a processing throughput, which is a number of elements of vector data processed by the batch program per unit time.

6. The data processing apparatus according to claim 4,
   wherein the processor is further configured to carry out:
   an acquisition procedure of acquiring a number of pieces of data to be processed, which is a number of pieces of stream data stored in a queue out of the time-series stream data sequence, and by the stream processing control program, a processing throughput, which is a number of elements of vector data currently processed by the batch program per unit time; and
   a calculation procedure of calculating, based on the processing throughput acquired by the acquisition procedure, an oldest time out of times included in the stream data stored in the queue, and a response time, which is a time from an input of each piece of stream data of the time-series stream data sequence to a completion of the batch processing in the batch program, a number of pieces of stream data that are processable by the batch program, and
   wherein, in the setting procedure, the processor is configured to set the input data size based on the number of pieces of data to be processed acquired by the acquisition procedure, the overlapping width, and the number of processable stream data calculated by the calculation procedure.

7. A data processing apparatus, comprising:
   a processor; and
   a memory for storing a batch program for carrying out batch processing, a stream program for carrying out stream processing, and a batch processing control program for controlling the batch program, the processor being configured to carry out:
- a first generation procedure of generating, by the batch processing control program, from vector data including an element sequence of values at respective times, a first stream data group, which is a time series acquired by dividing respective elements of a first element group in the element sequence;
- a second generation procedure of generating, by the batch processing control program, for a time-series second element group including, as a head, an intermediate element of the first element group in the element sequence and having the same number of elements as the first element group, a second stream data group, which is a time series acquired by dividing the respective elements of the second element group;
- a control procedure of inputting, by the batch processing control program, the first stream data group and the second stream data group generated respectively by the first generation procedure and the second generation procedure to the stream program to control the stream program to carry out the stream processing; and
- a conversion procedure of acquiring, by the batch processing control program, pieces of stream data of a third stream data group, which is an execution result of the input of the first stream data group to the stream program and the execution of the stream processing by the control procedure, acquiring a fourth stream data group, which is an execution result of the input of the second stream data group to the stream program and the execution of the stream processing by the control procedure, and converting a stream data group acquired by removing stream data of the fourth stream data group overlapping the stream data of the third stream data group from the fourth stream data group into second vector data, wherein the processor is further configured to carry out, by the batch processing control program, a setting procedure of setting an input data size, which is a number of pieces of stream data to be included in the first stream data group and the second stream data group, and an overlapping width, which is an overlapping number of the stream data between the first stream data group and the second stream data group.

8. The data processing apparatus according to claim 7,
wherein, in the first generation procedure, the processor is configured to generate, by the stream processing control program, based on the input data size and the overlapping width set by the setting procedure, the first stream data group from the first vector data, and
wherein, in the second generation procedure, the processor is configured to generate, by the stream processing control program, based on the input data size and the overlapping width set by the setting procedure, the second stream data group from the first vector data.

9. A data processing method to be executed by a data processing apparatus, the data processing apparatus comprising: a processor; and a memory for storing a stream program for carrying out stream processing, a batch program for carrying out batch processing, and a stream processing control program for controlling the stream program, the method comprising:
generating, in a first generation procedure, by the processor using the stream processing control program, for a time-series first stream data group of stream data out of a time-series stream data sequence, first vector data including elements acquired by collecting respective pieces of stream data of the time-series first stream data group;
generating, in a second generation procedure, by the processor using the stream processing control program, for a time-series second stream data group including, as a head, a piece of intermediate stream data of the time-series first stream data group in the time-series stream data sequence and having the same number of pieces of data as the time-series first stream data group, second vector data including elements acquired by collecting respective pieces of stream data of the time-series second stream data group;
inputting, in a control procedure, by the processor using the stream processing control program, the first vector data and the second vector data generated respectively by the first generation procedure and the second generation procedure to the batch program to control the batch program to carry out the batch processing, and
setting, in a setting procedure, by the processor using the stream processing control program, a number of elements to be included in the first vector data and the second vector data, which is the same as a number of pieces of data existing in the time-series first stream data group and the time-series second stream data group, as an input data size, and setting an overlapping number of the elements between the first vector data and the second vector data, which is the same as an overlapping number of pieces of stream data between the time-series first stream data group and the time-series second stream data group, as an overlapping width.

10. The data processing method according to claim 9,
wherein the processor is further configured to carry out:
- a first conversion procedure of converting, by the stream processing control program, for third vector data, which is an execution result of the input of the first vector data to the batch program and the execution of the batch processing by the control procedure, an element group of values at respective times included in the third vector data into a time-series third stream data group of values corresponding to the times; and
- a second conversion procedure of converting, by the stream processing control program, for fourth vector data, which is an execution result of the input of the second vector data to the batch program and the execution of the batch processing by the control procedure, an element group of values at respective times included in the fourth vector data into a time-series fourth stream data group of values corresponding to the times.

11. The data processing method according to claim 9,
wherein the processor is further configured to carry out an output procedure of outputting, by the stream processing control program, the time-series first stream data group and the time-series second stream data group, which are processing results of the stream processing carried out by controlling the stream program,
wherein, in the first generation procedure, the processor is configured to generate, by the stream processing control program, the first vector data for the time-series first stream data group output by the output procedure, and
wherein, in the second generation procedure, the processor is configured to generate, by the stream processing control program, the second vector data for the time-series second stream data group output by the output procedure.

12. The data processing method according to claim 9, wherein, in the first generation procedure, the processor is configured to generate, by the stream processing control program, based on the input data size and the overlapping width set by the setting procedure, the first vector data for the time-series first stream data group output by the output procedure, and wherein, in the second generation procedure, the processor is configured to generate, by the stream processing control program, based on the input data size and the overlapping width set by the setting procedure, the second vector data for the time-series second stream data group output by the output procedure.

13. The data processing method according to claim 12, wherein, in the setting procedure, the processor is configured to set, by the stream processing control program, the input data size based on a response time, which is a time from an input of each piece of stream data of the time-series stream data sequence to a completion of the batch processing in the batch program, an input rate, which is an interval of the input of the each piece of stream data to the batch program, and a processing throughput, which is a number of elements of vector data processed by the batch program per unit time.

14. The data processing method according to claim 12, wherein the processor is further configured to carry out:
an acquisition procedure of acquiring a number of pieces of data to be processed, which is a number of pieces of stream data stored in a queue out of the time-series stream data sequence, and by the stream processing control program, a processing throughput, which is a number of elements of vector data currently processed by the batch program per unit time; and
a calculation procedure of calculating, based on the processing throughput acquired by the acquisition procedure, an oldest time out of times included in the stream data stored in the queue, and a response time, which is a time from an input of each piece of stream data of the time-series stream data sequence to a completion of the batch processing in the batch program, a number of pieces of stream data that are processable by the batch program, and wherein, in the setting procedure, the processor is configured to set the input data size based on the number of pieces of data to be processed acquired by the acquisition procedure, the overlapping width, and the number of processable stream data calculated by the calculation procedure.

* * * * *